(12) United States Patent
Yeung et al.

(10) Patent No.: US 11,381,739 B2
(45) Date of Patent: Jul. 5, 2022

(54) PANORAMIC VIRTUAL REALITY FRAMEWORK PROVIDING A DYNAMIC USER EXPERIENCE

(71) Applicant: Intel Corporation, Santa Clara, CA (US)

(72) Inventors: Fai Yeung, Palo Alto, CA (US); Ling Yao, Portland, OR (US); Sankar Jayaram, Santa Clara, CA (US); Uma Jayaram, Santa Clara, CA (US); Ritesh Kale, Cupertino, CA (US); Ok Joon Kim, Cupertino, CA (US); Shaun Carrigan, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/749,862

(22) Filed: Jan. 22, 2020

(65) Prior Publication Data

US 2020/0236278 A1    Jul. 23, 2020

Related U.S. Application Data

(60) Provisional application No. 62/795,731, filed on Jan. 23, 2019.

(51) Int. Cl.
*H04N 5/232* (2006.01)
*G06T 19/00* (2011.01)
(Continued)

(52) U.S. Cl.
CPC ....... *H04N 5/23238* (2013.01); *G06T 19/006* (2013.01); *H04N 5/2625* (2013.01); *H04N 5/272* (2013.01); *G06T 2219/004* (2013.01)

(58) Field of Classification Search
CPC ............ G06T 19/006; G06T 2219/004; H04N 5/23238; H04N 5/2625; H04N 5/272;
(Continued)

(56) References Cited

U.S. PATENT DOCUMENTS 10,129,608 B2 * 11/2018 Han .................. H04N 21/8456
10,531,137 B1 *  1/2020 Matak ................. A63F 13/211
(Continued)

*Primary Examiner* — Christopher S Kelley
*Assistant Examiner* — Kathleen M Walsh
(74) *Attorney, Agent, or Firm* — Nicholson De Vos Webster & Elliott LLP

(57) ABSTRACT

An apparatus, system, and method are described for providing real-time capture, processing, and distribution of panoramic virtual reality (VR) content of a live event. One or more triggering events are identified and used to generate graphics and/or audio on client VR devices. For example, one embodiment of a method comprises: capturing video of an event at an event venue with a plurality of cameras to produce a corresponding plurality of video streams; generating a virtual reality (VR) stream based on the plurality of video streams; transmitting the VR stream to a plurality of client VR devices, wherein the client VR devices are to render VR environments based on the VR stream; detecting a triggering event during the event; and transmitting an indication of the triggering event to the plurality of client VR devices, wherein a first client VR device is to generate first event-based graphics and/or first event-based audio in accordance with the indication.

24 Claims, 29 Drawing Sheets

(51) Int. Cl.
  *H04N 5/262* (2006.01)
  *H04N 5/272* (2006.01)
(58) Field of Classification Search
  CPC ......... H04N 21/21805; H04N 21/2187; H04N 21/43072; H04N 21/43074; H04N 21/44016; H04N 21/4728; H04N 21/8146; H04N 21/816; H04N 5/232; H04N 5/232061; H04N 5/247; H04N 5/268
  USPC .......................................................... 348/36
  See application file for complete search history.

(56) References Cited

U.S. PATENT DOCUMENTS

| | | | |
|---|---|---|---|
| 2012/0204202 A1* | 8/2012 | Rowley | A63F 13/40 |
| | | | 725/12 |
| 2013/0070047 A1* | 3/2013 | DiGiovanni | H04N 21/234345 |
| | | | 348/36 |
| 2014/0150042 A1* | 5/2014 | Pacor | H04N 21/21805 |
| | | | 725/116 |
| 2017/0157512 A1* | 6/2017 | Long | A63F 13/86 |
| 2017/0182406 A1* | 6/2017 | Castiglia | G06K 9/00335 |
| 2017/0264936 A1* | 9/2017 | Depies | G06T 19/006 |
| 2017/0318325 A1* | 11/2017 | Ortiz | H04N 21/2181 |
| 2018/0084310 A1* | 3/2018 | Katz | G06Q 30/0242 |
| 2018/0167656 A1* | 6/2018 | Ortiz | A63F 13/355 |
| 2018/0199080 A1* | 7/2018 | Jackson, Jr. | H04N 21/2187 |
| 2019/0102941 A1* | 4/2019 | Khan | G06T 19/003 |
| 2019/0102944 A1* | 4/2019 | Han | G06T 15/20 |
| 2019/0104325 A1* | 4/2019 | Linares | H04N 21/236 |
| 2019/0114485 A1* | 4/2019 | Chan | G11B 27/031 |
| 2019/0122500 A1* | 4/2019 | Joao | G07F 17/3288 |
| 2020/0074181 A1* | 3/2020 | Chang | G06K 9/00744 |
| 2020/0162796 A1* | 5/2020 | Azuolas | H04N 21/23439 |
| 2020/0226843 A1* | 7/2020 | Khan | H04N 13/194 |

* cited by examiner

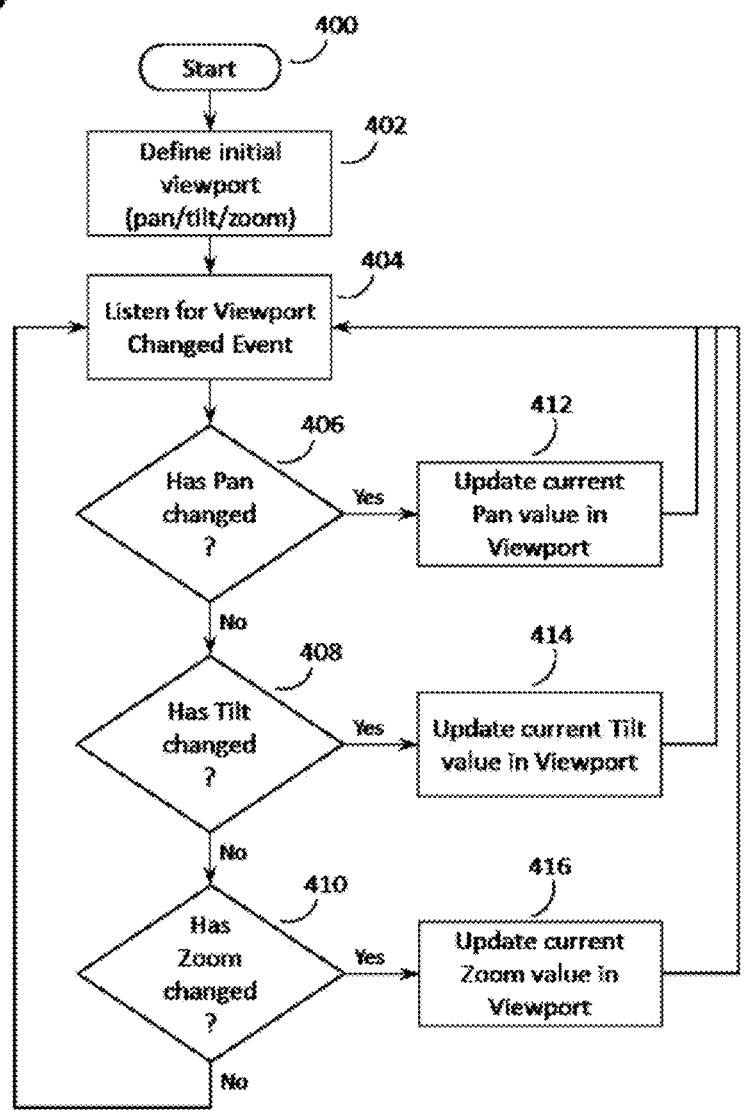

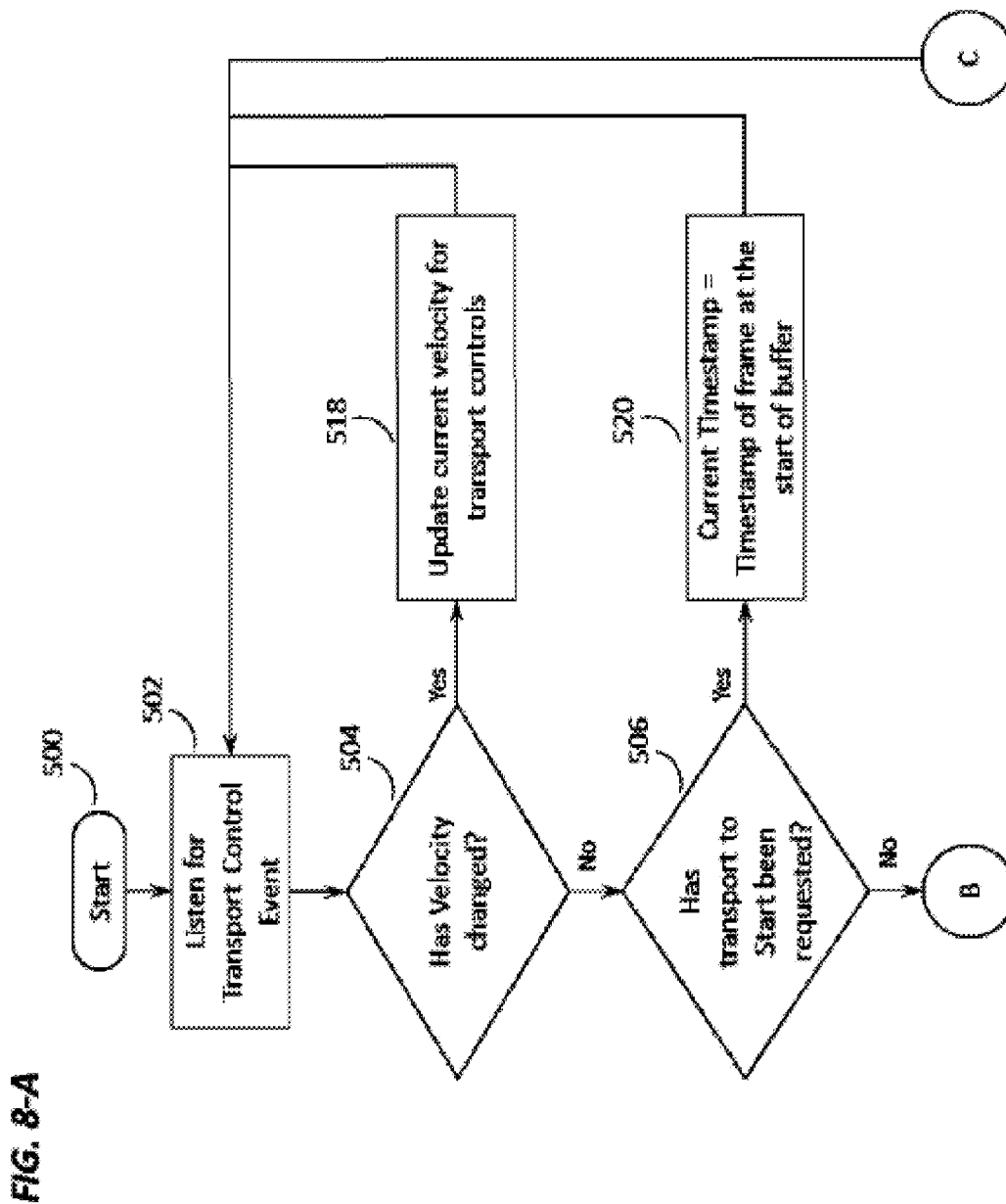
FIG. 8-A

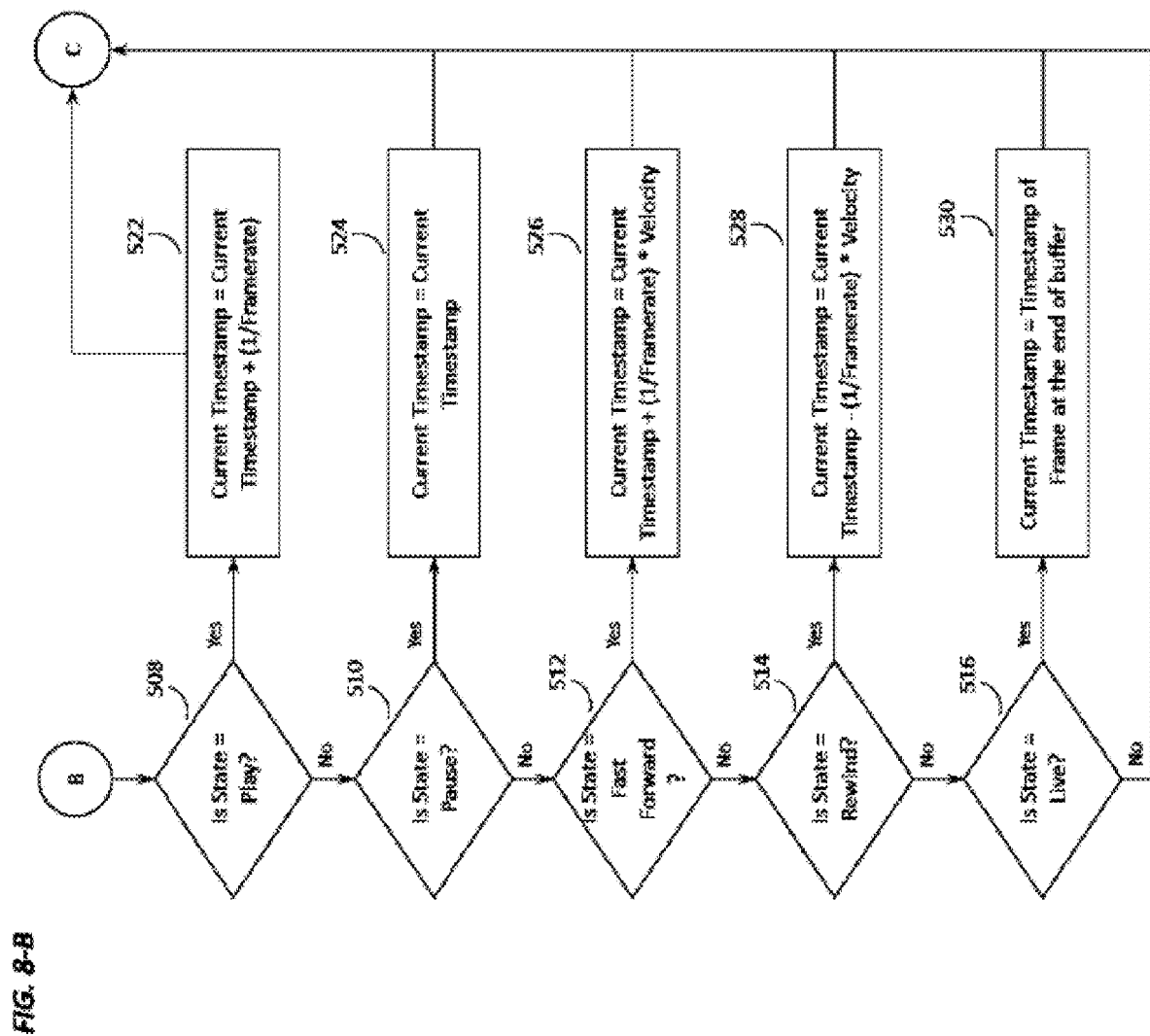
FIG. 8-B

PANORAMIC VIRTUAL REALITY FRAMEWORK PROVIDING A DYNAMIC USER EXPERIENCE

CROSS REFERENCE TO RELATED APPLICATIONS

This application claims the benefit of U.S. Provisional Patent Application Ser. No. 62/795,731, which was filed Jan. 23, 2019, all of which is hereby incorporated herein by reference.

BACKGROUND

Field of the Invention

This disclosure pertains to videography, image capture, and playback. More particularly, this disclosure relates to systems and methods for processing and distributing live virtual reality content.

Description of the Related Art

Techniques are known for capturing and viewing panoramic images. Most techniques involve a capture system that captures and processes a series of images to form panoramic images. Sequences of these images form panoramic videos. Techniques for viewing panoramic images typically include a user input method for viewing a portion of the panoramic image on a screen, giving the user a feel of being able to look around in the panoramic image. In addition, techniques are known for transport controls using a buffer of a live video feed. These controls allow a viewer to buffer a live feed on a local device and forward, rewind, pause, and jog through the buffered video.

BRIEF DESCRIPTION OF THE DRAWINGS

A better understanding of the present invention can be obtained from the following detailed description in conjunction with the following drawings, in which:

FIG. 3 is a schematic diagram showing how multiple panoramic video feeds can be received at a client by a receiver and user interface that also has controller functionality built in.

FIG. 7 is a flow chart showing the steps involved in handling a Viewport Changed Event triggered by the user.

FIGS. 8-A and 8-B are two parts of a flowchart showing how the Transport Control Events are handled by the system and how the time stamp for the frame to be displayed to the user is determined based on the Video Playback State of the viewer application.

DETAILED DESCRIPTION

This disclosure is submitted in furtherance of the constitutional purposes of the U.S. Patent Laws "to promote the progress of science and useful arts" (Article 1, Section 8).

Embodiments of the present invention disclose an apparatus and method for receiving a video stream from a plurality of Panoramic Video Camera Heads or from a local storage disk, storing the video data in a local memory buffer, and viewing regions of interest within any one of the panoramic videos using user interface devices, while controlling the video time, playback speed, and playback direction globally across all panoramic video data in a synchronous manner. According to one construction, multiple Panoramic Video Camera Heads and are synchronized through a time code generator that triggers the image capture across all camera heads synchronously. According to another construction, multiple camera heads are synchronized by one "Master" camera head that sends trigger signals to all the camera heads. Further, according to yet another construction, each camera head is set to "free-run" with a pre-defined frame rate, and the processing computers all capture the latest frame from each of these cameras and timestamp them with a time code from a time code generator.

Various embodiments herein are described with reference to the figures. However, certain embodiments may be practiced without one or more of these specific details, or in combination with other known methods and configurations. In the following description, numerous specific details are set forth, such as specific configurations and methods, etc., in order to provide a thorough understanding of the present disclosure. In other instances, well-known construction techniques and methods have not been described in particular detail in order to not unnecessarily obscure the present disclosure. Reference throughout this specification to "one embodiment" or "an embodiment" means that a particular feature, configuration, composition, or characteristic described in connection with the embodiment is included in at least one embodiment. Thus, the appearances of the phrase "in one embodiment" or "an embodiment" in various places throughout this specification are not necessarily referring to the same embodiment. Furthermore, the particular features, configurations, compositions, or characteristics may be combined in any suitable manner in one or more embodiments.

As used herein, the term "Transport Control" is understood to mean a user interface that allows a viewer to control the video playback, such as choosing between play, pause, rewind and forward, and the speed of rewind or forward.

Figure 1:
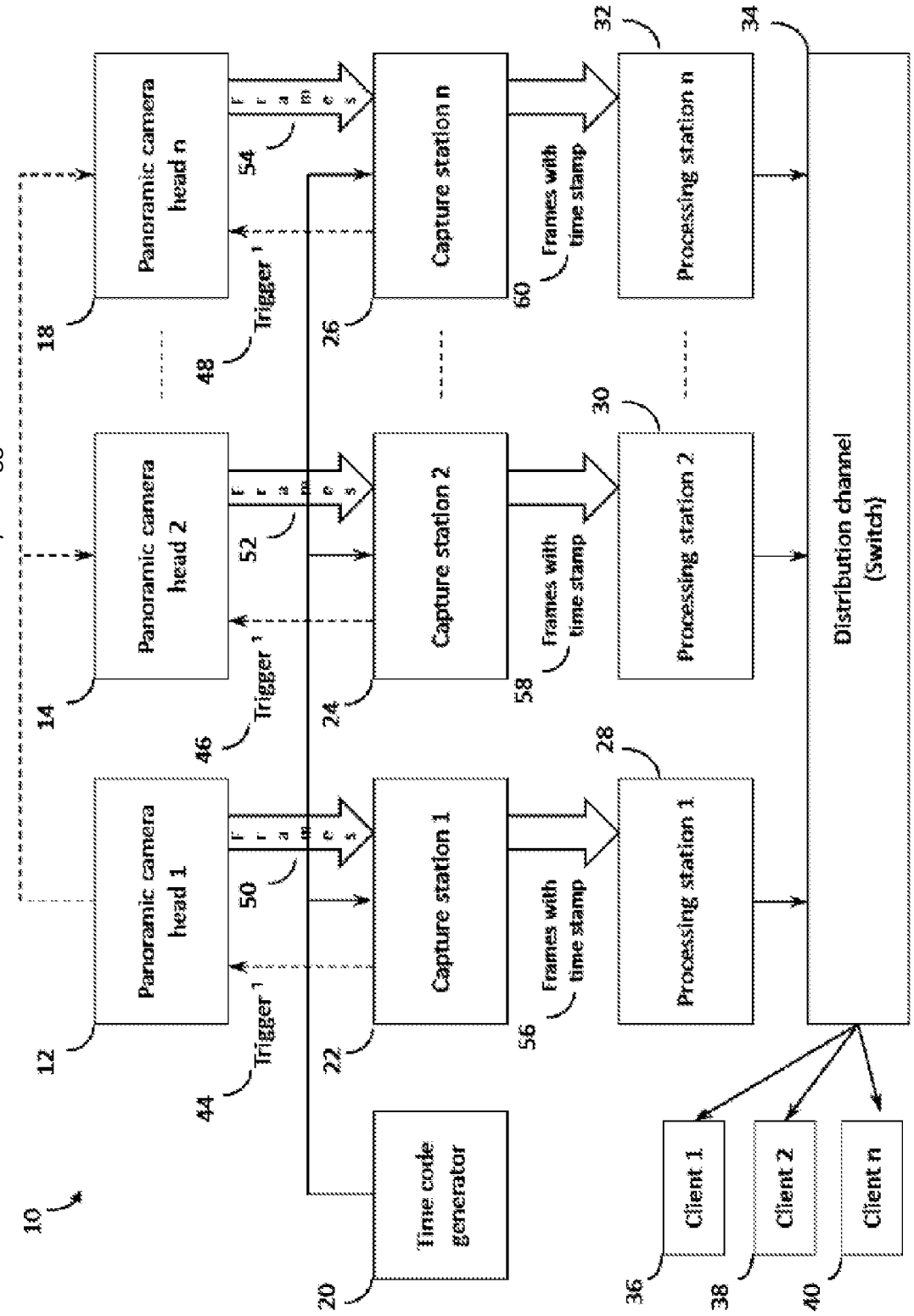
FIG. 1 is a schematic diagram showing unique embodiments of time code synchronization mechanisms that could be used to synchronize frames being captured by capture stations from a plurality of panoramic camera heads before being processed and distributed.

FIG. 1 shows construction of the time code synchronization mechanism 10 extending across a plurality of panoramic camera heads 12, 14 and 18 and capture stations 22, 24 and 26. A time code generator 20 is used to get a consistent time stamp based on the desired rate that frames 50, 52 and 54 need to be captured from the panoramic cameras 12, 14 and 18. The same time code from time code generator 20 is received by each of the Capture Stations 22, 24 and 26, and in one of the embodiments of this mechanism, the time code is used to trigger.sup.1 44, 46 and 48 the panoramic cameras 12, 14 and 18. This is also referred to as a "software trigger" 44, 46 and 48 of the panoramic cameras 12, 14 and 18. The panoramic cameras 12, 14 and 18 capture a frame 50, 52 and 54 when triggered by trigger 44, 46 and 48, respectively, and return the frame 50, 52 and 54 to the corresponding Capture Stations 22, 24 and 26 that generated the trigger 44, 46 and 48. The Capture Stations 22, 24 and 26 attach the time-stamp information from the time code to the frames, forming "frames with time stamps" 56, 58 and 60. Because the time-code is shared between Capture Stations 22, 24 and 26, the frames 56. 58 and 60 generated from each of the Capture Stations 22, 24 and 26 for a given time-code are synchronized, as they have the same time-stamp. These frames 56, 58 and 60 are then transmitted to the Processing Station 28, 30 and 32, respectively, where they are compressed for transmission over the network and sent to some Distribution Channel 34. The time-stamp information on the frames 56, 58 and 60 is maintained throughout this processing, compression, and distribution process. The distribution device, or channel (switch) 34 is configured to distribute the processed images or compressed video stream to client processors in clients 36, 38 and 40. Clients 36, 38 and 40 also include memory.

Another embodiment of the time code synchronization mechanism 10 of FIG. 1 involves triggering the panoramic camera heads 12, 14 and 18 using a "hardware sync trigger.sup.2" 42. The hardware trigger 42 is generated at specific time intervals based on the desired frame rate. This rate of hardware triggering has to match the rate of time codes being generated by the time code generator 20. One of the panoramic camera heads 12, 14 and 18 acts as a "Master" and all other panoramic camera heads 12, 14 and 18 act as "Slaves". The "Master" panoramic camera triggers itself and all the "Slave" panoramic cameras synchronously. When a trigger is generated, a frame is captured at the panoramic camera 50, 52 or 54. Once the frame 50, 52 or 54 is captured, an event is invoked at the Capture Station 22, 24 or 26, and this is when the Capture Station 22, 24 or 26 "grabs" the frame from the camera 12, 14 or 18, and associates the time stamp corresponding to the latest time-code received from the time-code generator 20 to the frame 50, 52 or 54.

A third embodiment of the time code synchronization mechanism 10 of FIG. 1 involves letting the panoramic cameras 12, 14 and 18 capture frames in a "free run" mode, where each of the panoramic cameras 12, 14 and 18 trigger as fast as possible. The Capture Station 22, 24 and 26 uses the time code signal to "grab" the latest frame 50, 52 or 54 that was captured by the panoramic camera 12, 14 or 18, and associates the time stamp corresponding to the time-code with the frame.

Figure 2:
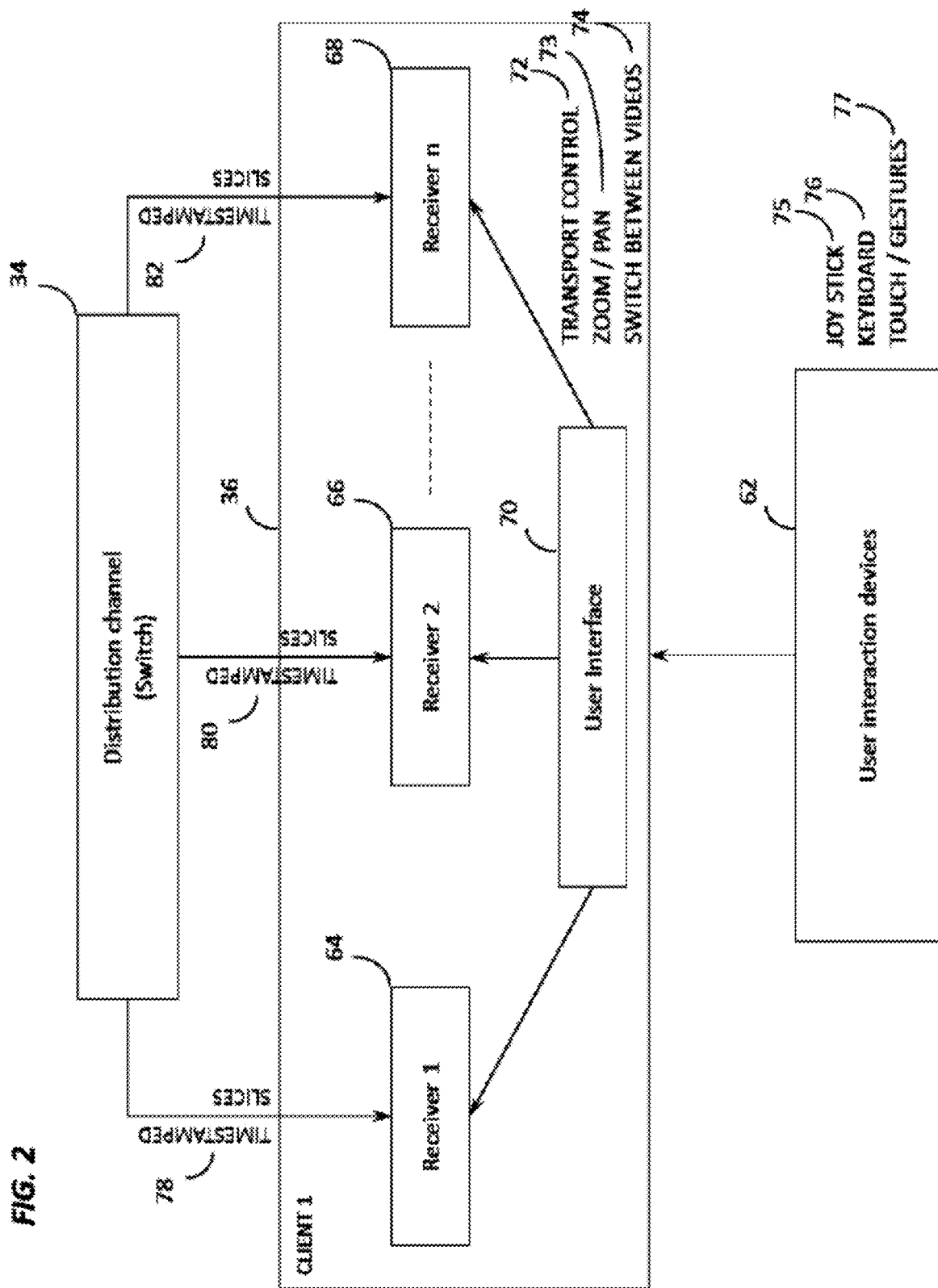
FIG. 2 is a schematic diagram showing how multiple receivers, or receiving modules on a viewer machine would receive time-stamped frames from the panoramic video feeds, and to show the user interface as the intermediate application for managing how the user input requests are handled and how the clients are manipulated to cater to the user request.

FIG. 2 shows multiple receivers 64, 66 and 68 on a client machine 36 receiving time-stamped slices 78, 80 and 82, respectively, from the panoramic video feeds via distribution channel 34. A user interface 70 on the client machine 36 determines which receiver is the active receiver 64, 66 or 68 displayed to the user. User interface 70 also manages the user interaction input from devices 62 like a joystick 75, a keyboard 76, and a touch or gesture based device(s) 77. User interface 70 uses this input to determine which client stream should be the active stream (switch between videos 74), and what section of the panoramic video should be displayed (zoom/tilt/pan 73) to the end-user. Another input from the user-interaction devices is the input related to transport control 72. User interface 70 uses this input and passes it on to all the receivers. This enables all the receivers to perform the same transport control operations to their respective panoramic video streams, and ensures that all the panoramic video streams are synchronized.

Figure 3:
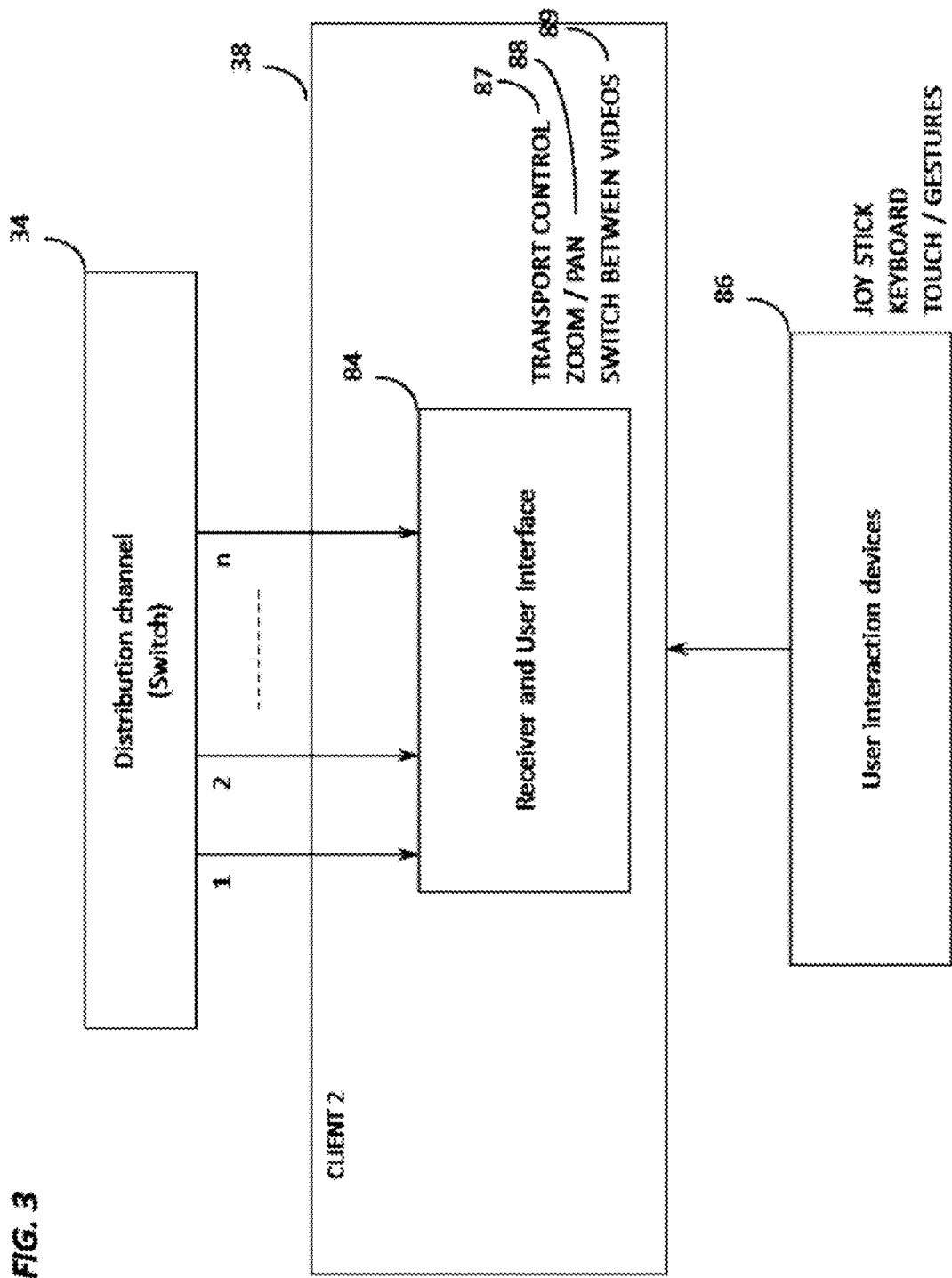

FIG. 3 shows another embodiment of the client application on the viewer machine. In this embodiment, a single application serves as the receiver and user interface 84. The receiver receives time-stamped frames for all the panoramic video streams via distribution channel 34 and manages each of these streams in its own application memory. The receiver also includes processing circuitry. User interface functionality described in FIG. 2 is also integrated in this application. As described in FIG. 2, the user interface manages the input from the user interaction devices 86 and performs the actions for switching between videos 89, what section of the panoramic video should be displayed (zoom/pan/tilt 88) to the end-user, and how to apply the transport control 87 to all the streams in memory.

Figure 4:
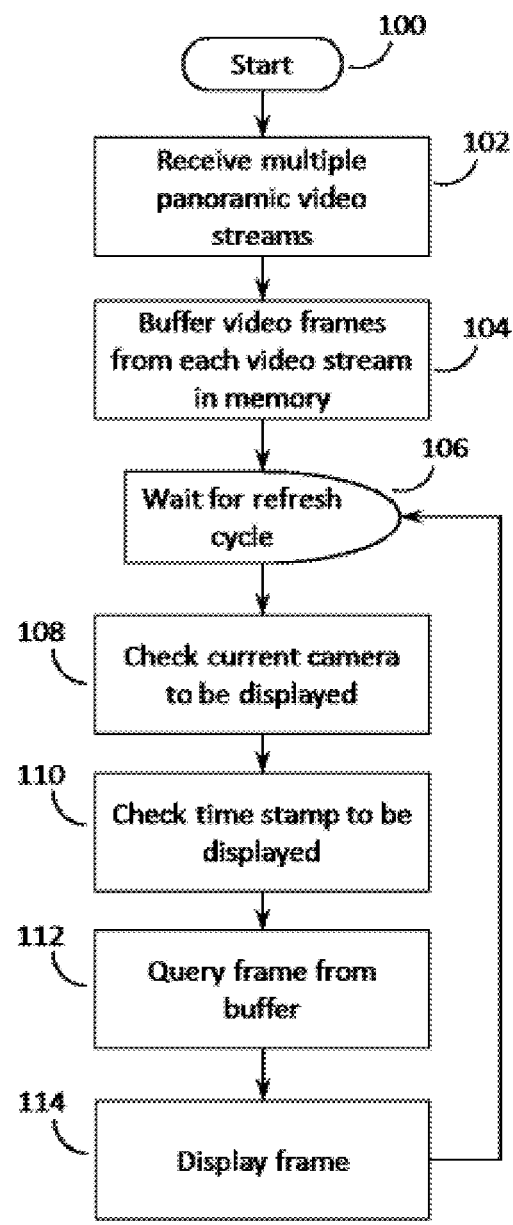
FIG. 4 is a flow chart showing the steps involved in a viewer machine to receive multiple panoramic video streams, to buffer the frames from each feed, and to determine the frame from the buffer to be displayed to the end user based on the camera in view and the time stamp sought by the user.

The following variables are stored with the controller module for receiver and user interface 84 that determine the state of the view that is displayed to the end-user: a. Current Camera to be displayed b. Current Time Stamp of the frame to be displayed c. Current Video Playback State—Possible values are Play, Pause, Fast Forward, Rewind, Live d. Current Viewport—The viewport is determined by the current zoom, pan, and tilt values The user interaction devices 86 could generate the following types of events that are handled by the receiver and user interface 84: a. Camera Changed Event b. Video Playback State Changed Event c. Viewport Changed Event d. Transport Control Event FIG. 4 shows the steps involved in a viewer machine to receive multiple panoramic video streams and determine the frame to be displayed to the end user. The frames from each panoramic video stream that is received by the viewer machine 102 are buffered in memory (Hard disk drive, application memory, or any other form of storage device) 104. Each frame received by the viewer machine has a time-stamp associated with it, which serves as the key to synchronize frames across multiple panoramic streams. Once the frames have started buffering, the viewer application enters a refresh cycle loop starting with a "wait for refresh cycle" 106. The refresh cycle is a periodic set of operations performed by the application at every refresh interval of the display. The viewing application stores the information about the panoramic camera being displayed 108 and the information about the time stamp to be displayed based on the playback state of the application and user inputs related to transport controls. For each refresh cycle, the application checks the current panoramic camera that needs to be displayed, and then checks for the time stamp to be displayed 110. Using these two pieces of information, the appropriate frame to be displayed is sought from the buffer in memory 112. This frame is then passed on to the application for display 114 in that refresh cycle.

Figure 5:
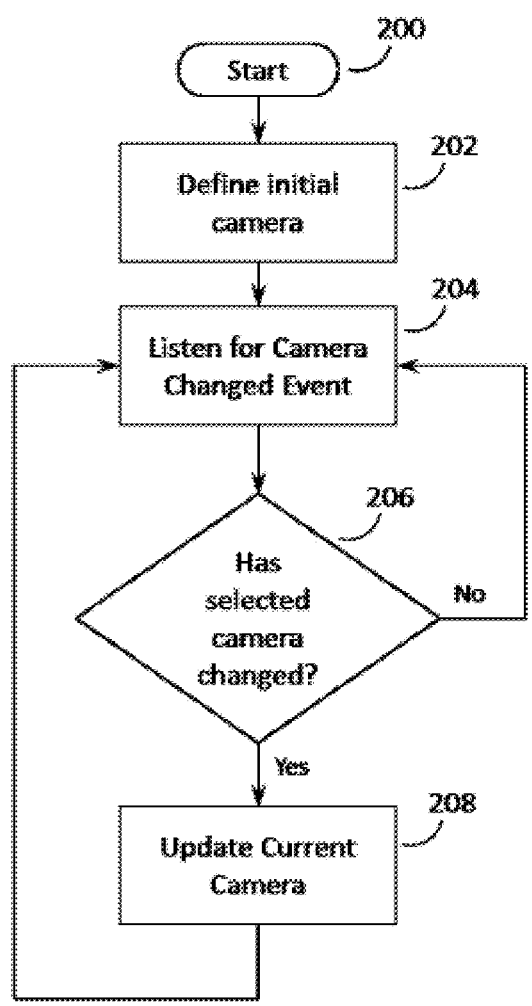
FIG. 5 is a flow chart showing the steps involved in handling a Camera Changed Event triggered by the user.

FIG. 5 shows the steps involved in handling the Camera Changed Event triggered by the user. An initial camera is used, or defined 202 as the default after initiating a start 200. Then the application goes into a 'listen' mode 204 where it is waiting for Camera Changed Events 206 triggered by the user interaction devices. When a request for changing the selected camera is received, the local variable in the application that stores current camera information is updated 208, and the application goes back into the 'listen' mode, waiting for the next Camera Changed Event.

Figure 6:
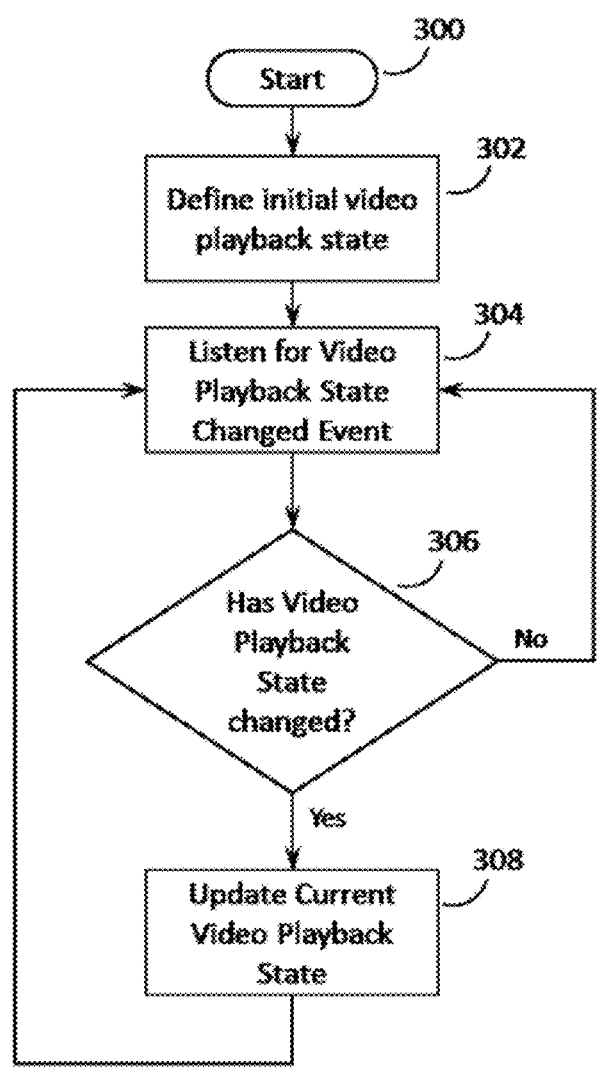
FIG. 6 is a flow chart showing the steps involved in handling a Video Playback State Changed Event triggered by the user.

FIG. 6 shows the steps involved in handling the Video Playback State Changed Event triggered by the user from start 300. An initial video playback state 302 is used as the default to start with. Then the application goes into a 'listen' mode 304 where it is waiting for Video Playback State Changed Events 306 triggered by the user interaction devices. When a request for changing the video playback state is received, the local variable in the application that stores the current video playback state is updated 308, and the application goes back in the 'listen' mode, waiting for the next Video Playback State Changed event.

FIG. 7 shows the steps involved in handling the Viewport Changed Event triggered by the user from start 400. The viewport could be changed by changing the zoom, tilt, or pan. An initial zoom, tilt, and pan is used as a default 402 to start with. Then the application goes into a 'listen' mode 404 where it is waiting for Viewport Changed Events triggered by the user interaction devices. When a request for changing the viewport is received, the application checks to see if the zoom 410, pan 406, or tilt 408 value has been changes, and updates the local variables 416, 412 and 414, respectively in the application that store the zoom, pan, and tilt. The application then goes back in the 'listen' mode, waiting for the next Viewport Changed Event.

FIGS. 8a and 8b show how the Transport Control Events are handled by the viewing application initiated at start 500. The application is listening for Transport Control Changed Events 502. The application checks to see if the velocity of transport control was changed 504. If the velocity was changed, the value of the velocity stored within the application is updated 518 and the application goes back to listening for Transport Control Changed Events. If velocity has not changed, then the application checks to see if the user has requested to "Transport to Start" 506 so that they view the start of the buffered video stream in memory. If "Transport to Start" was requested, the value of the current timestamp to display is changed to be the same as the timestamp of the frame at the start of the buffer in memory 520, and the application goes back to listening for Transport Control Changed Events. If "Transport to Start" was not requested, then the application determines the current timestamp to be used for display based on playback state that the application is in. If the application is in "Play" state 508, then the current timestamp is incremented to the next timestamp 522. If the application is in the "Pause" state 520, then the current timestamp is not changed 524. If the application is in the "Fast Forward" 512 or "Rewind" state 514, then the current timestamp is incremented 526 or decremented 528 taking the frame rate and velocity of transport into account. If the application is in the "Live" state 516, then the current timestamp is set to the timestamp of the frame at the end of buffered frames in memory 530.

Figure 9:
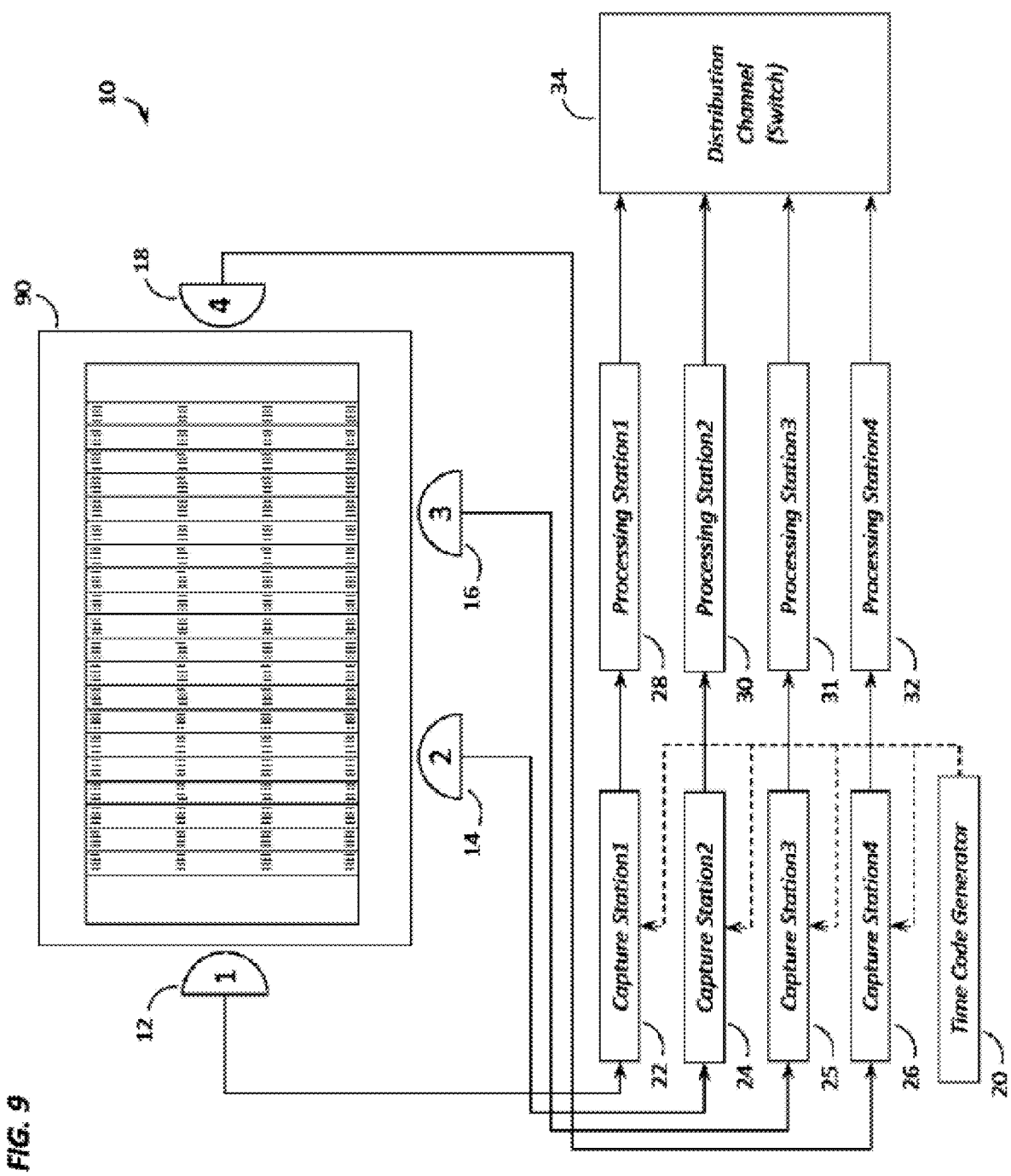
FIG. 9 shows how multiple panoramic cameras are strategically placed an event location and how they are connected to the capture stations, processing stations, and distribution channel.

FIG. 9 shows a football field 90 as the event location where multiple panoramic cameras 12, 14, 16 and 18 are located at strategic locations such that they provide different angles to view a sporting event from and allow one or more end-users to choose the angle that is best suited (for them) for viewing the event at any given point in time. Each of the panoramic video cameras 12, 14,16 and 18 is connected to a capture station 22, 24, 25 and 26, respectively. Each capture station 22, 24, 25 and 26 receives a time-code from a time-code generator, and the time-stamp from the time-code is attached to the frames received from the panoramic video camera. The frames are then transmitted to the processing stations 28, 30, 31 and 32 where they are processed and streamed out to the distribution channel 34. Distribution channel 34 receives the frames and communicates the frames over a network to multiple clients that are connected to the distribution channel.

A panoramic video capture device as used herein comprises multiple sensors placed in a circular array such that a portion of image captured by each sensor overlaps with a portion of image captured by adjacent sensors. The overlapping images from the different sensors are captured synchronously based on a trigger mechanism, and these overlapping images form the basis for creation of a single, seamless panoramic image.

As used herein, a processor is a high-performance server-grade machine housing multiple graphic processing units (GPUs). A GPU is capable of performing large number of operations in parallel. The use of multiple GPUs in the processor allows for highly parallelized computations on multiple image frames being communicated by the panoramic video capture device. Memory can also be resident.

A processor comprises the following modules. First, a capture module is responsible for triggering the panoramic video capture device and retrieving the image frames once the exposure of the frame is complete. In certain embodiments of the capture module, the triggering of the sensors is not performed by this module. There is a separate trigger mechanism for the sensors and the capture module is notified of the event every time a new image frame is available on the panoramic video capture device. When this notification is received by the capture module, it retrieves the image frame from the panoramic video capture device.

As used herein, a processing module is operative to receive the raw frame from the capture module and applies the following filters to the raw frame: Demosaicing filter: In this filter, a full color image is reconstructed using the incomplete color samples from the raw image frames. Coloring filter: The full color image output from the demosaicing filter is then converted to appropriate color space (for example, RGB) for use in downstream modules. Seam blending filter: Colored images output from the coloring filter are used for blending the seam using stitching algorithms on the overlap between adjacent images.

As used herein a splicing module is responsible for using the images output from the processing module, and putting them together with the ends lined up against each other in such that the aggregate of these individual images creates one panoramic image.

Also as used herein, a slicing module takes the seam blended panoramic image, and splits this image into multiple slices. This is done so that each slice of the panoramic image can be distributed over the network in an optimized fashion. This overcomes the existing limitations of certain network protocols that cannot communicate panoramic images above a certain size of the image.

As used herein, a time stamp module listens for the time code from the time code generator. This time stamp is then attached to each slice of the image sections output from the slicing module.

As used herein, a compression module takes the image frame output by the time stamp module and compresses it using certain image compression techniques (JPEG, H.264, etc.) for transmission of over the network.

As used herein, a distribution device is a kind of router or switch that is used for transmitting the compressed frames over the network. Multiple clients could connect to the distribution device and receive the image frames being transmitted. In addition to this, subsequent distribution devices themselves could be connected to a distribution device transmitting the images for relaying the images over a wide network.

As used herein a client process processes the combination of sub-processes and modules on a viewer's machine to receiving image frames from a distribution device, store them in buffer, manage the user input from the user interaction devices, and display the video images to the end-user.

The client process is broken down into the following modules:

A receiving module which connects to the source of the video images via the distribution device, receives the images over the network, and stores them in a buffer on the viewer's machine.

A user interface module is used for managing the user input from the user interaction devices. In one of the implementations of the user interface module, the joystick controller is used for capturing the user input. The user input could be provided using buttons on the joystick or using the multiple thumb pad controls on the joystick. Different buttons are used to track the video playback state change input for play, pause, fast forward, rewind, or live mode A thumb pad control is used to track the viewport change inputs for zoom, pan, tilt of the view Another thumb pad control is used to track the transport control input for jogging forward or back based on the velocity of jog determined by how far the thumb pad control has been pushed.

A display module is used for displaying portion of the panoramic video frames to the user. The portion of the video frame to be displayed is determined based on the inputs from the user interface module. Image frame from the buffer is fetched and based on the other user inputs, the portion of the panoramic image to be displayed is determined. This portion is then displayed to the end-user for viewing.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

Panoramic Broadcast Virtual Reality (VR) Architecture

Figure 10:
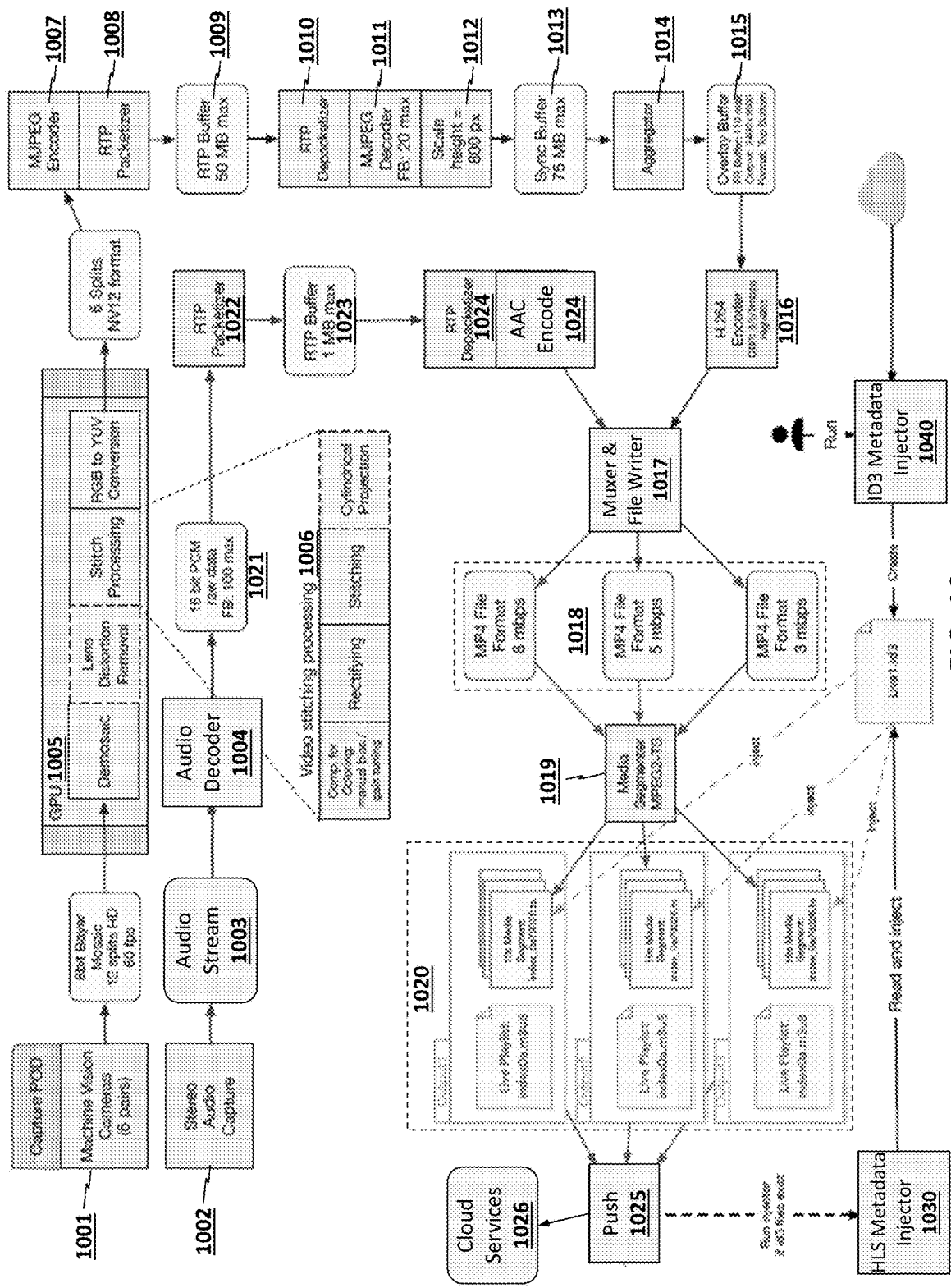
FIG. 10 illustrates one embodiment of an architecture for capturing and streaming real time video of an event.

FIG. 10 illustrates one example of a panoramic broadcast virtual reality (VR) system. As mentioned, in one embodiment, a plurality of stereoscopic cameras 1001 capture video of an event from different perspectives (e.g., a sporting event, musical performance, theatrical performance, etc) and stereo audio capture unit 1002 simultaneously captures and encodes audio 1003 of the event. In one implementation, the six pairs of stereoscopic cameras are integrated on a video capture device 1001 (referred to herein as a capture POD) and any number of such video capture devices 1001 are distributed at different event locations to capture video from different perspectives. As used herein, a stereoscopic camera is typically implemented as two cameras: one to reproduce a left eye perspective and one to reproduce a right eye perspective. As discussed below, however, in certain embodiments (e.g., such as when bandwidth reduction is required) only the left (right) eye video may be captured and the right (left) stream may be reproduced by performing a transformation on the left (right) video stream (i.e., using the coordinate relationship between the left and right eyes of a user as well as the coordinates of the event).

While certain embodiments described herein use six stereoscopic cameras in each device POD, any number of pairs of stereoscopic cameras may be used while still complying with the underlying principles of the invention (e.g., 10 pairs/POD, 12 pairs/POD, etc).

In one embodiment, regardless of how the cameras 1001 are configured, the video stream produced by each capture POD comprises an 8-bit Bayer mosaic at with 12 splits (i.e., 12 different image streams from the 6 pairs of cameras). One or more graphics processing units (GPUs) 1005 then process the video stream in real time as described herein to produce a panoramic VR stream. In the illustrated embodiment, the GPU 1005 performs various image processing functions including, but not limited to, de-mosaic operations, cropping to remove redundant portions of adjacent video streams, lens distortion reduction, color adjustments, and image rotations.

Figure 11:
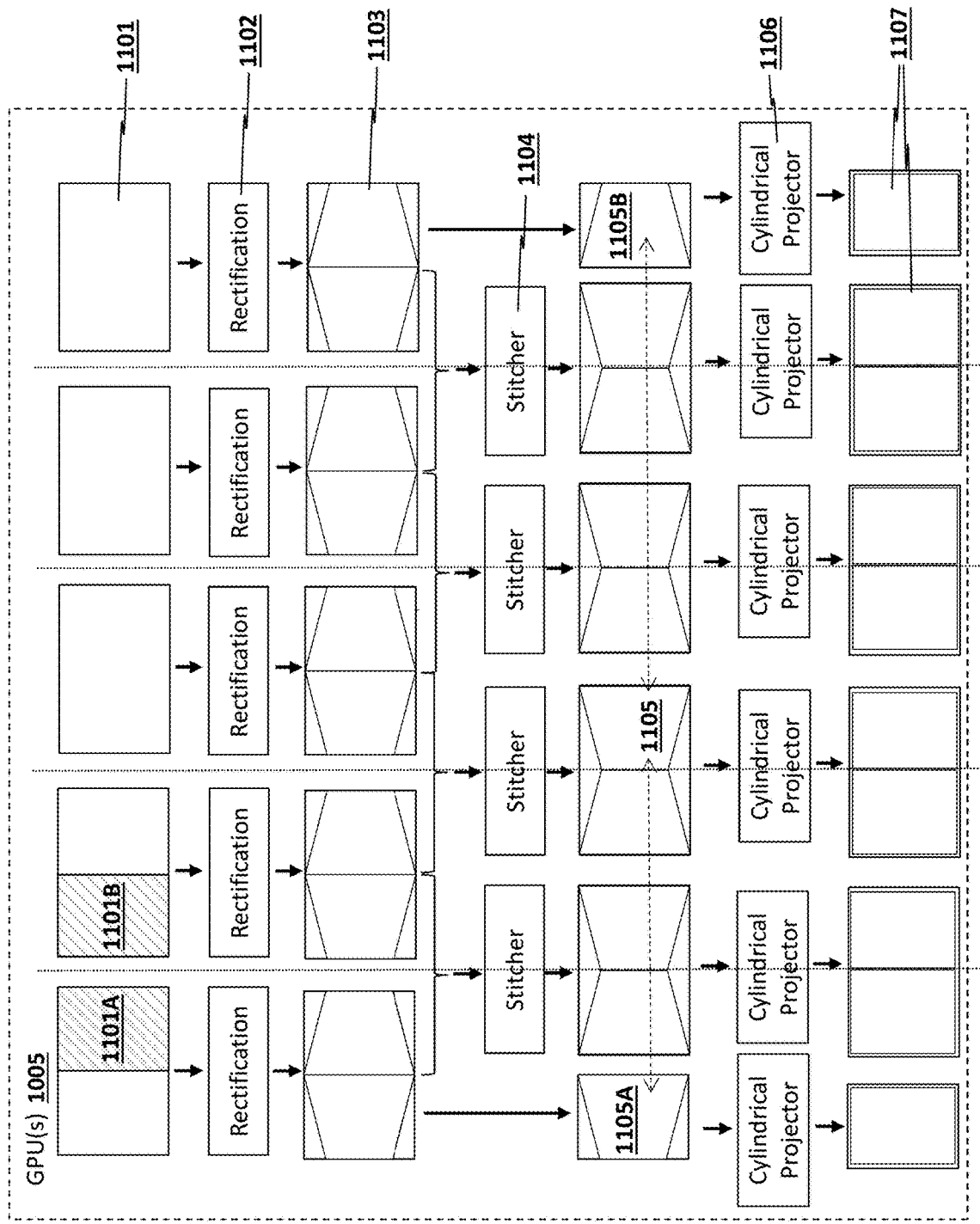
FIG. 11 illustrates one embodiment which performs stitching using rectification followed by cylindrical projection.

Following image processing, the GPU 1005 performs stitch processing 1006 on adjacent image frames to form a stitched panoramic image. One example of the stitch processing 1006 illustrated in FIG. 11 includes rectification operations 1102, stitching operations 1104, and cylindrical projection operations 1106. In particular, FIG. 11 illustrates a specific implementation of stitching using 5 image streams to generate the panoramic image stream. It is assumed that the 5 illustrated streams are processed for one eye (e.g., the left eye) and that the same set of operations are performed concurrently for the other eye (e.g., the right eye).

The highlighted regions 1101A-B of two of the images in the top row of images 1101 indicates the overlapping portions of each image that will be used to identify the stitch. In one embodiment, the width of these regions is set to some fraction of the overall width of each image (e.g., ¼, ⅓, ½). The selected regions include overlapping video content from adjacent images. In one embodiment, the GPU aligns the left image with the right image by analyzing and matching this content. For example, one implementation performs a 2D comparison of the pixel content in each row of pixels. One or more feature points from a first image region (e.g., 1101A) may be identified and used to identify corresponding feature points in the second image region (e.g., 1101B). In other implementations (some of which are described below) a more complex matching model may be used such as belief propagation.

Image rectification 1102 is performed, projecting the images 1103 onto a common image plane. Following rectification, a stitcher 1104 implemented by the GPU uses the designated regions of adjacent rectified images 1103 to match pixels (in accordance with a specified matching algorithm) and identify the correct orientation and overlap between the rectified images 1103. Once the image overlap/orientation is identified, the stitcher 1104 combines each adjacent image to form a plurality of stitched, rectified images 1105. As illustrated, in this particular implementation there are two ½ image portions 1105A-B remaining at each end of the panoramic video.

A cylindrical projector 1106 then projects the stitched images 1105 onto a virtual cylindrical surface to form a smooth, consistent view for the end user in the final panoramic video image 1107.

The embodiments described above may be implemented in software executed on the GPU(s) 1005, by fixed function circuitry, and/or a combination of software and fixed function circuitry (e.g., with some stages being implemented in hardware and others in software). Although not illustrated in the Figures, the data for each image may be stored in a system memory, a caching subsystem on the GPU(s) 1005, a local GPU memory, and/or a GPU register file.

Figure 12C:
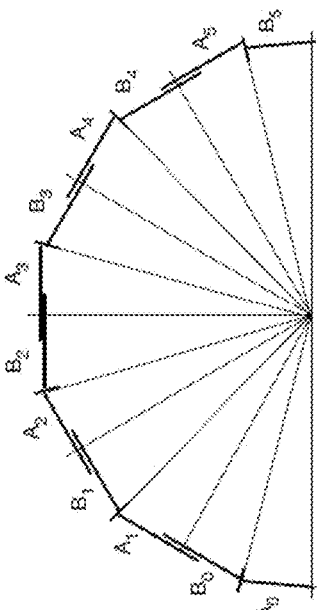
FIGS. 12A-12E illustrate top views of operations performed to generate a panoramic virtual reality video stream.
Figure 12D:
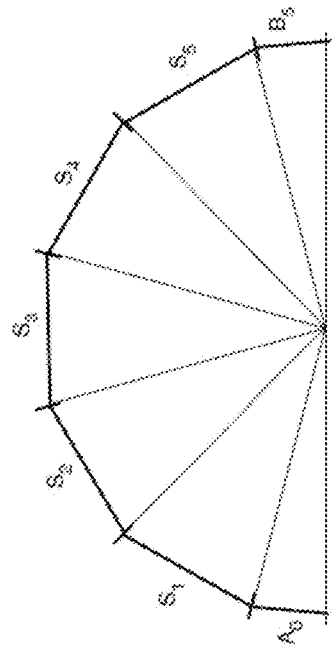
Figure 12B:
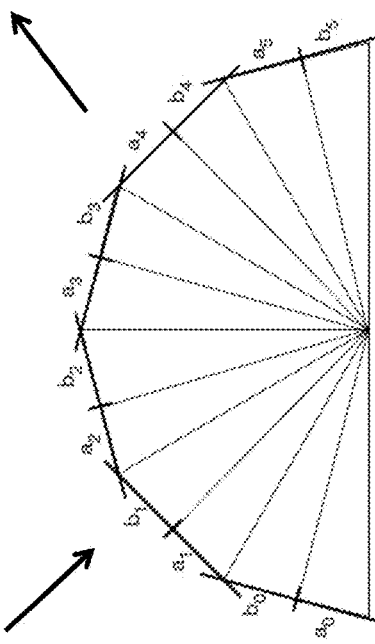
Figure 12A:
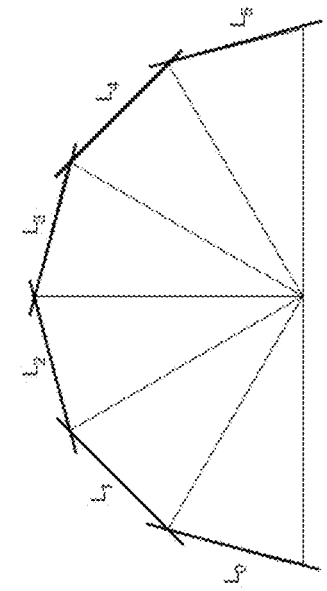

FIGS. 12A-E illustrate the effects of this sequence of operations on the video images from an elevated perspective (i.e., looking down in a direction parallel to the image planes). In particular, FIG. 12A illustrates six input images $\{L_i\}^5_{i=0}$. In one embodiment, correction for lens distortion is performed on the input images at this stage.

In FIG. 12B, each image is split in half vertically (ai, bi)=split(Li) and in FIG. 12C, each pair $(b_i, a_{i+1})^4_{i=0}$ is rectified by a "virtual rotation" about each view's y-axis (which is equivalent to a homography operation). The two end portions $A_0$ and $B_0$ are also rotated but are not involved in stitching. The following code specifies the operations of one embodiment:

for i=0 . . . 4
$B_i$=rectify($b_i$, α, left) (α is determine empirically)
$A_{i+1}$=rectify($a_i$+1, α, right)
$A_0$=rectify($a_0$, α, right)
$B_5$=rectify(bs, α, left)

Figure 12E:
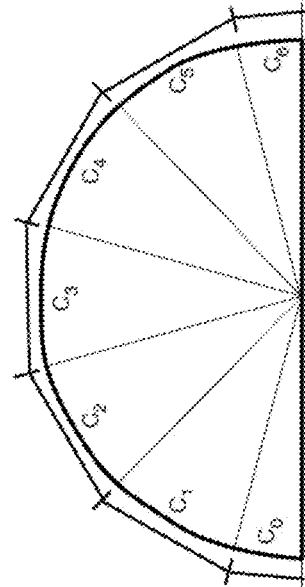

FIG. 12D shows stitching of rectified pairs $S_{i+1}$=stitch($B_i$, $A_{i+1}$)$^4_{i=0}$ in accordance with one embodiment. Note that this creates a "crease" at the original image centers, but numerically it is sufficiently precise to not create a "seam." In one embodiment, these creases are removed by the cylindrical projection in the next operation (FIG. 12E). In contrast, prior stitching pipelines generated creases at the stitch which resulted in undesirable distortion and a lower quality stitch.

As illustrated in FIG. 12E, a full cylindrical projection is performed for the five stitched images and "half" cylinder projections for the two end images. This is shown as image frames $S_1$-$S_5$ being curved around the virtual cylinder to form $C_1$-$C_5$ and end image frames $A_0$ and $B_5$ being similarly curved to form $C_0$ and $C_6$, respectively. The seven resulting images are concatenated together to form the final panoramic image, which is then processed by the remaining stages of the pipeline.

Figure 13:
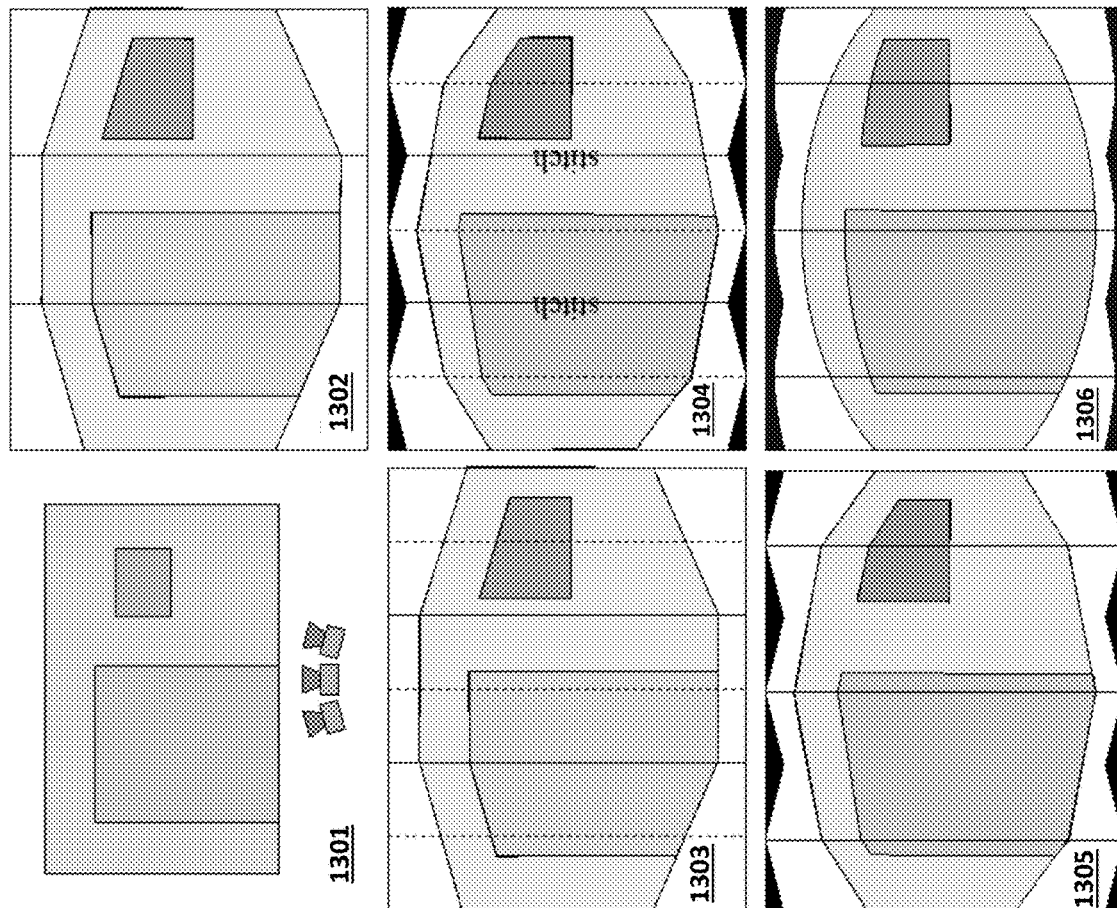
FIG. 13 illustrates a front view of a subset of the operations performed to generate a panoramic virtual reality video stream.

FIG. 13 illustrates another perspective using a simplified set of images 1301-1306 (i.e., captured with three cameras). Image 1301 shows the arrangement of cameras used to capture the video frames shown in image 1302 (overlap not shown). Each image is split vertically in image 1303. In image 1304, each image is transformed using a homography transformation which is a perspective re-projection that effectively rotates neighboring image planes so that they are parallel (see, e.g., FIG. 12C). This rectifies the images fed to the stitcher so that common features are aligned along the same image rows, which is an important operation for fast and accurate stitching.

In image 1305, neighboring images are stitched along their overlapping regions. Note that the homography results in "folds" along the original image center lines. Finally, image 1306 shows a cylindrical projection which is used to create the final panorama Returning to the overall architecture shown in FIG. 10, following rectification, stitching, and cylindrical projection, the GPU 1005 performs RGB to YUV conversion to generate 6 splits (see, e.g., 1107 in FIG. 11). In one embodiment, an NV12 format is used, although the underlying principles of the invention are not limited to any particular format. In the illustrated implementation, a motion JPEG encoder 1007 encodes the image frames 1107 using motion JPEG (i.e., independently encoding each image frame without inter-frame data as used by other video compression algorithms such as MPEG-2).

The encoded/compressed video frames generated by the MJPEG encoder 1007 are packetized by Real-Time Transport Protocol (RTP) packetizer 1008 and stored in a buffer 1009 prior to being transmitted over a network/communication link to RTP depacketizer 1010. While RTP is used to communicate the encoded/compressed video frames in this embodiment, the underlying principles of the invention are not limited to any particular communication protocol.

The depacketized video frames are individually decoded by MJPEG decoder 1011 and scaled 1012 based on desired scaling specifications (e.g., to a height of 800 pixels in one embodiment). The scaled results are temporarily stored in a synchronization buffer 1013. An aggregator 1014 combines multiple video streams, potentially from different capture PODs 1001 and stores the combined streams in a temporary storage 1015 (e.g., such as the overlay buffer described herein).

In one embodiment, an H.264 encoder 1016 encodes the video streams for transmission to end users and a muxer & file writer 1017 generates video files 1018 (e.g., in an MP4 file format) at different compression ratios and/or bitrates. The muxer & file writer 1017 combines the H.264 encoded video with the audio, which is captured and processed in parallel as described directly below.

Returning to the audio processing pipeline, the stereo audio capture unit 1002 captures an audio stream 1003 simultaneously with the video capture techniques described herein. In one embodiment, the stereo audio capture unit 1002 comprises one or more microphones, analog-to-digital converters, and audio compression units to compress the raw audio to generate the audio stream 1003 (e.g., using AAC, MP3 or other audio compression techniques). An audio decoder 1004 decodes the audio stream to a 16-bit PCM format 1021, although various other formats may also be used. An RTP packetizer generates RTP packets in an RTP buffer 1023 for transmission over a communication link/network. At the receiving end, an RTP depacketizer 1024 extracts the PCM audio data from the RTP packets and an AAC encoder 1024 encodes/compresses the PCM audio in accordance with the AAC audio protocol (although other encoding formats may be used).

A media segmenter 1019 temporally subdivides the different audio/video files into segments of a specified duration (e.g., 5 seconds, 10 seconds, 15 seconds, etc) and generates index values for each of the segments. In the illustrated embodiment, a separate set of media segments 1020 are generated for each audio/video file 1018. Once generated, the index values may be used to access the media segments by clients. For example, a user may connect to the real time VR streaming service and be redirected to a particular URL pointing to a particular set of media segments 1020. In one embodiment, the network characteristics of the client's network connection may initially be evaluated to determine an appropriate set of media segments encoded at an appropriate bitrate.

As illustrated one or more metadata injectors 1030, 1040 insert/inject various forms of metadata to the media segments 1020. By way of example, and not limitation, the metadata may include the current scoring and other relevant data associated with the sporting event (e.g., player statistics, rankings, current score, time remaining, etc), information related to the musical performance (e.g., song titles, lyrics, authors, etc), and any other information related to the event. In a sporting implementation, for example, the scoring data and other relevant data may be displayed within a graphical user interface of the VR client and/or integrated directly within the panoramic video stream (e.g., displayed over the actual scoreboard at the event). Moreover, various types of metadata may be injected including HTTP Live Streaming (HLS) metadata injected by an HLS metadata injector 1030 and ID3 metadata injected by the ID3 metadata injector 1040.

In one embodiment, a push unit 1025 dynamically pushes out the various media segments 1020 to one or more cloud services 1026 from which they may be streamed by the VR clients. By way of example, and not limitation, the cloud services 1026 may include the Amazon Web Services (AWS) Cloud Front Web Distribution platform. The pushing of media segments may be done in addition to or instead of providing the media segments 1020 directly to the VR clients via the VR service provider's network.

Figure 14:
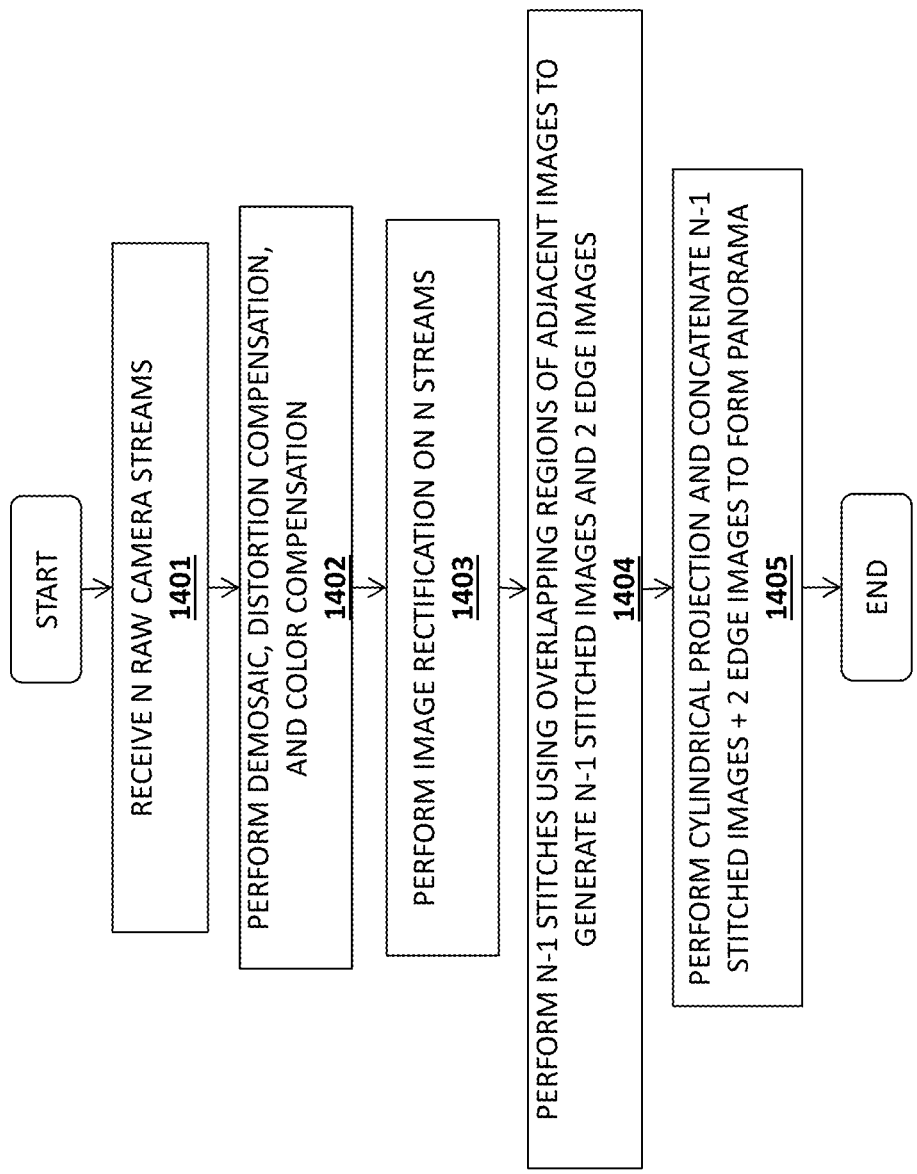
FIG. 14 illustrates a method in accordance with one embodiment of the invention.

A method for efficiently and accurately stitching video images in accordance with one embodiment of the invention is illustrated in FIG. 14. The method may be implemented within the context of the system architectures described above, but is not limited to any particular system architecture. At 1401, N raw camera streams are received (e.g., for each of the left and right eyes). At 1402, demosaicing is performed to reconstruct a full color image from potentially incomplete color samples received from the cameras. Various other image enhancement techniques may also be employed such as distortion compensation and color compensation.

At 1403, image rectification is performed on the N streams and, at 1404, N−1 overlapping regions of adjacent images are processed by the stitching algorithm to produce N−1 stitched images and 2 edge images. At 1405, cylindrical projection and concatenation are performed on the N−1 stitched images and the two edge images to form the panoramic image.

Stitching Using Belief Propagation

As mentioned, one embodiment of the invention employs belief propagation techniques to perform stitching of adjacent images. Belief propagation (BP) (or "sum-product message passing"), is a technique in which inferences are made on graphical models including Bayesian networks and Markov random fields. The belief propagation engine calculates a marginal distribution for each unobserved node, based on observed nodes.

In the context of image stitching, belief propagation is used to identify a most likely matching pixel in a second frame for each pixel in a first frame. Belief propagation has its own internal parameters which dictate how different variables are to be weighted to identify matching pixels. However, the results using standard internal parameters are not ideal.

To address these limitations, one embodiment of the invention performs modifications to the basic belief propagation parameters to generate significantly improved results. In general, there exists a tension between the accuracy of the pixel match and the smoothness/continuity of the seam. Choosing parameters which are weighted towards accuracy will result in degraded continuity and vice-versa. One embodiment of the invention chooses a set of "ideal" parameters based on the requirements of the application.

Figure 15:
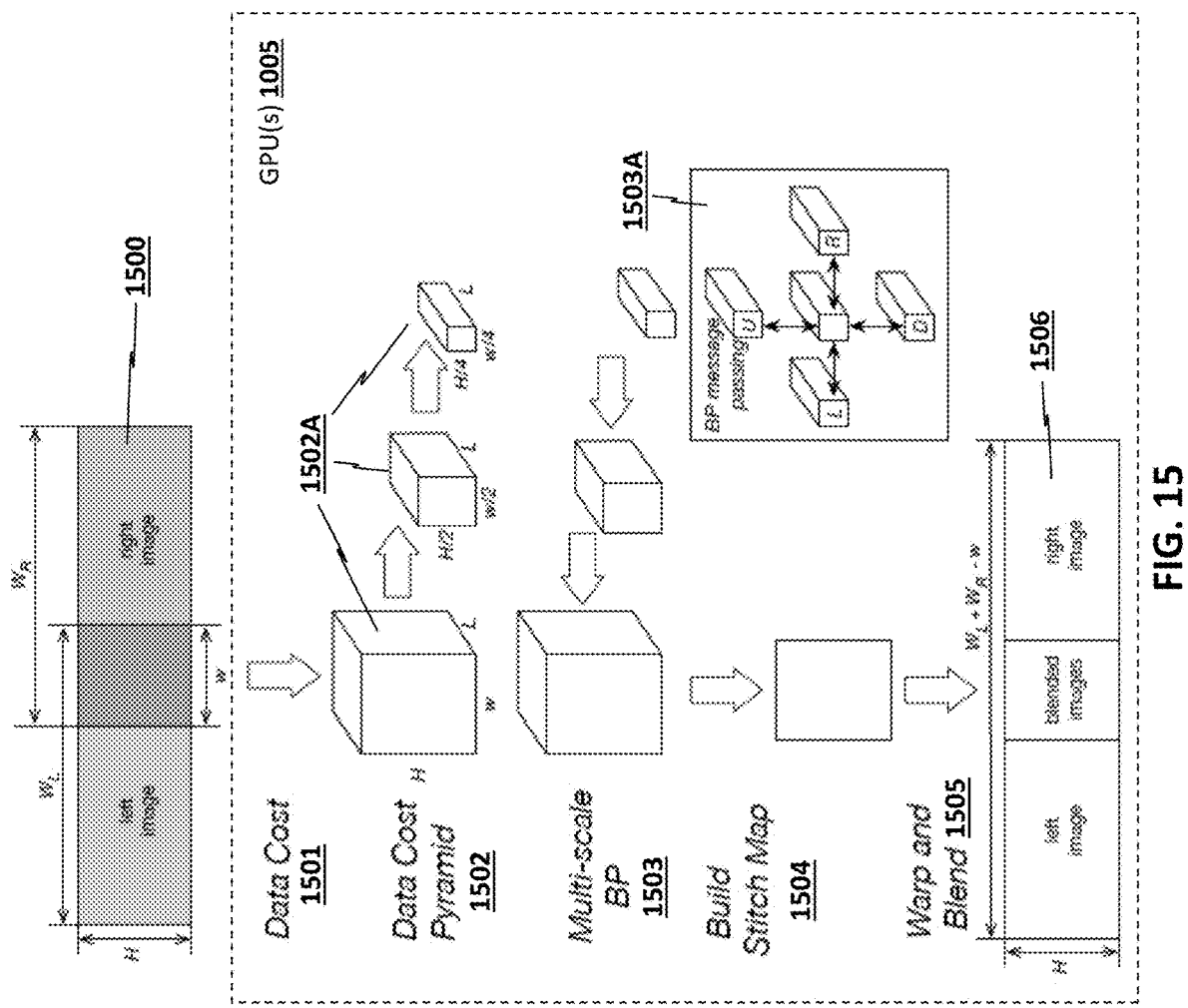
FIG. 15 illustrates one embodiment which performs stitching operations using Belief Propagation.

FIG. 15 illustrates the sequence of operations 1501-1505 performed by one embodiment of the Belief Propagation engine. These operations include initially performing a data cost evaluation 1501 where, for each pixel in the w×H overlapping region between the left and right input image 1500, a cost vector of length L is computed that estimates the initial cost of matching L different candidate pixels between the left and right images.

Each cost value is a real number (e.g., stored as a floating point number). There are many ways to compute this cost such as sum of absolute differences (SAD) or sub of squared differences (SSD). In one embodiment, the result of this computation is a w×H×L "cost volume" of real numbers.

One embodiment finds the index with the lowest cost (i.e., $\mathrm{argmin}_i L_i$), but the result at this stage will be too noisy. A "consensus" will be developed between neighboring pixels on what the costs should be. Creating cost values that are more coherent or "cost smoothing" is the one of the primary functions of Belief Propagation.

The cost $L_i$ is converted into a probability $1/e^{Li}$ and normalized. The goal is to minimize the cost (energy minimization) or maximize the probability. Different flavors of Belief Propagation. One embodiment is described in terms of energy minimization, sometimes called the "negative log probability space." One implementation also normalizes the colors to adjust for different brightness and exposures between cameras.

Furthermore, in one embodiment, the number of rows of the images being stitched are down-sampled by a factor (e.g., 2, 3, 4, etc) to speed up the process, thereby reducing the memory footprint and enhancing tolerance for misaligned frames. It is assumed that the images have been rectified so that common features are on the same scan lines (i.e., epipolar lines match and are parallel). Additional image processing may be done at this stage as well such as implementing a high-pass filter to reduce noise from cameras (e.g., charge coupled device (CCD) noise).

Following data cost analysis 1501, a data cost pyramid is constructed at 1502. In one embodiment, starting with the initial data cost volume, a series of smaller volumes 1502A are constructed of size $\{w/2^i \times H/2^i \times L | i=0 \ldots\}$ that make up the data-cost pyramid by averaging/down-sampling cost values. Note that the cost vectors are still of length L for all volumes in the pyramid.

Starting with the smallest volume in the data-cost pyramid, several iterations of Belief Propagation message passing 1503A are performed. The results are then up-sampled to the next largest volume at 1503 and Belief Propagation message passing 1503A is performed again using the up-sampled values as a starting point. For each step four more volumes are created to hold the messages that are passed up, down, left, and right between neighboring cost vectors. Once the iterations are complete, the final costs are computed from the original cost volume and the message volumes. These are used to seed the iteration at the next higher level.

When the final results are generated, a stitch map is constructed at 1504. In one embodiment, the optimal label i is determined for each pixel by computing the "final beliefs" via $i=\text{argmin}_i L_i$. These indices i identify which two pixels form the best correspondence between the original left and right images in the overlap region. To speed things up, one embodiment short circuits the multi-scale Belief Propagation process by stopping the iterative process and forming the stitch map from a smaller volume. This results in a smaller stitch map that can be bi-linearly sampled from when stitching. In one embodiment, the stitch map is sorted in a hardware texture map managed by the GPU(s) 1005.

The final image is then stitched by performing warping and blending in accordance with the stitch map 1504 to generate the final stitched image frame 1506. In particular, for each pixel in the overlapping region the stitch map is used to determine which two pixels to blend. One embodiment blends using a convex linear combination of pixels from each image:

result pixel=(1−t)*left pixel+t*right pixel, where t varies from 0 to 1 when moving from left to right across the overlap region. This blend biases towards left pixels on the left edge and biases towards right pixels on the right edge. Pixels in the middle are formed with a weighted average. Laplacian Blending is used in one embodiment to reduce blurring artifacts.

In one implementation, a completely new stitch is performed for every frame. Given the significant processing resources used to identify the stitch, one embodiment of the invention feeds back the previous stitch parameters for one or a combination of previous frames to be used to stitch the current frame.

Figure 16:
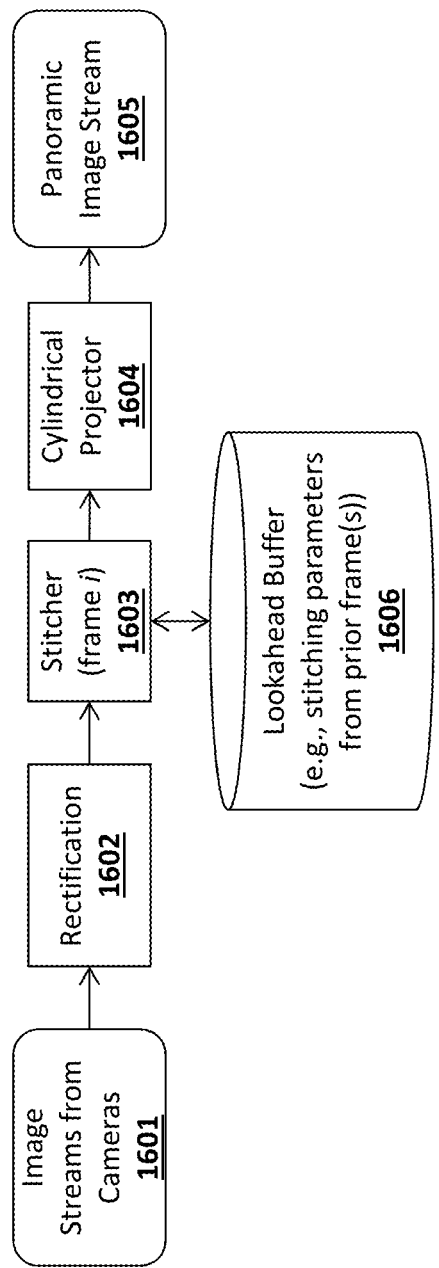
FIG. 16 illustrates a stitching architecture which uses stitching parameters from one or more prior frames to stitch a current frame.

FIG. 16 illustrates one embodiment of an architecture which includes rectification circuitry/logic 1602 for performing rectification of images streams from the cameras 1601 (e.g., of one or more capture PODs) and stitcher circuitry/logic 1603 which stores stitching parameters from prior frames to be used as a starting point. In particular, a lookahead buffer 1606 or other type of storage is used by the stitcher 1603 to store parameters from previous stitches and read those parameters when processing the current set of image frames. For example, the specific location of a set of prior feature points may be stored and used to identify the stitch for the current image frames (or at least as a starting point for the current image frames).

In one embodiment, the parameters from previous stitches may simply be the parameters from the last stitch. In another embodiment a running average of these parameters is maintained (e.g., for the last N stitches). In addition, in an implementation which uses belief propagation, the previously-determined depth map pyramids shown in FIG. 15 may be reused.

In one embodiment, blending between adjacent images is used when a stitch fails. A failed stitch may occur, for example, due to insufficient information, disparate lighting (which may be temporary), and any other circumstances where similarities between pixels cannot be determined.

In response to a failure, one embodiment of the invention analyzes the previous and next scan lines and blends them together. Different types of blending may be selected based on characteristics of the two frames. The blending may include (but is not limited to) linear blending, Laplacian blending, and Gaussian blending. Alternatively, or in addition, when pixels cannot be differentiated, the stitch parameters from one or more prior stitches may be used (as described above).

In one embodiment, the luminance (Y) plane is used to perform stitching operations, excluding the U and V planes, to reduce the amount of data required for stitching. Color does not provide significant value for stitching, unless certain types of operations such as background subtraction are used. Thus, the stitching pipeline is optimized with YUV requiring less memory and less time for conversions.

In one implementation, if two Y values from the two frames are identical or within a specified threshold, the U and the V values may then be evaluated to provide further differentiation between the pixels (e.g., to determine whether they have similar/same colors) thereby providing a more efficient culling mechanism (i.e., to cull candidates which are outside of the threshold).

One embodiment the invention quantifies stitch accuracy, potentially evaluating each seam down to a single number. As the stitch is changed, this embodiment searches for patterns, evaluates the associated numbers and identifies the one with the highest quantity as the stitch. This may be performed for each scan line where the belief propagation algorithm determines the extent to which this is a good stitch (i.e., quantifies the stitch accuracy).

Different types of variables may be evaluated to arrive at the number including data cost (how well left matches right pixel) and smoothness (how well two neighboring pixels agree).

Bandwidth Reduction and Failure Recovery

In circumstances where network bandwidth is severely limited and/or in cases where one of the camera streams is non-functional or occluded, one embodiment reproduces one stream (e.g., which is occluded) using video streams from one or more adjacent cameras. For example, in one embodiment, in response to detecting that a stream from camera N is detected (e.g., the left eye stream in a left/right stereoscopic pair of cameras) one embodiment of the invention performs an image transformation on the stream from adjacent cameras N+1 and/or N−1 to reproduce the camera N stream.

Figure 17:
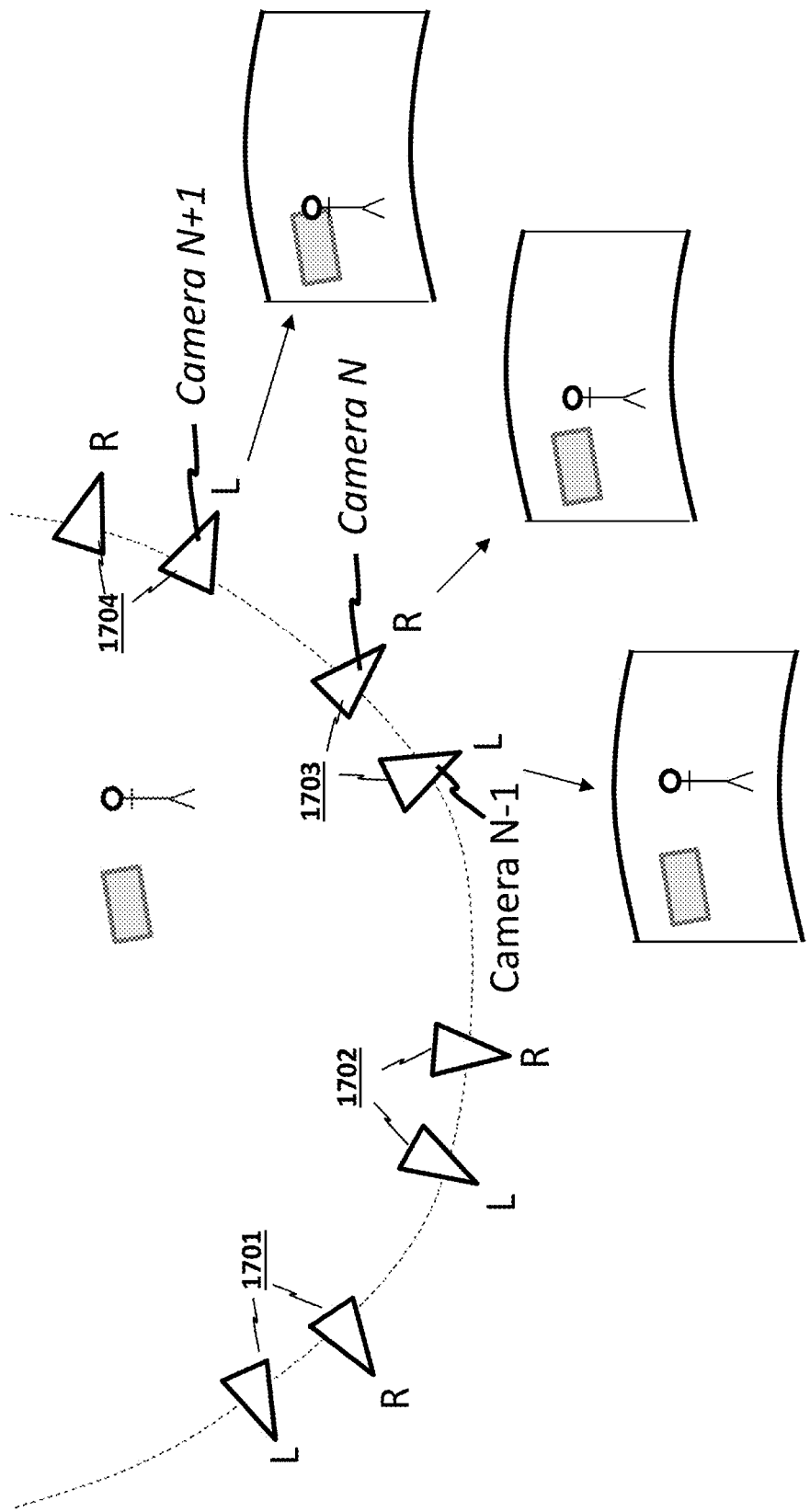
FIG. 17 illustrates one embodiment which performs coordinate transformations to reduce bandwidth and/or storage.

FIG. 17 illustrates an example arrangement in which a plurality of left/right cameras 1701-1704 capture an event from different viewpoints. An image of a stick figure is captured relative to a grey rectangle. These two objects are used to illustrate the manner in which the perspective changes from camera N−1 to camera N+1. For example, in the video stream from camera N−1, there is a larger separation between the two objects while from camera N+1, there is no separation (i.e., the user is occluding a portion of the rectangle).

It can be seen from this arrangement, that there is a significant overlap in the image data captured by cameras N, N+1, and N−1. The embodiments of the invention take advantage of this overlap to reduce bandwidth and/or compensate for the failure or camera N. For example, per-camera transformation matrices may be calculated prior to an event based on the orientation differences between a first camera (e.g., camera N) and one or more adjacent cameras (e.g., camera N+1). If the differences in orientation of the two cameras is known (e.g., X, Y, Z vector defining the 3 D direction each camera is pointing, the distance to the event objects from the cameras, etc) then these differences may be used to generate a transformation matrix for camera N which can be used to reconstruct it's video stream.

In one embodiment, two transformation matrices are generated for camera N: one for camera N+1 and one for camera N−1. Using two cameras ensures that all of the necessary video data will be available to reconstruct camera N's video stream. However, in other embodiments, only one video stream from one adjacent camera is used. In this case, the camera selected for the reconstruction should be the corresponding left/right camera. For example, if camera N is a left eye camera, then camera N+1 (used for the transformation) should be the corresponding right eye camera. Choosing the alternate eye camera makes sense given the significant correlation in orientation between the left/right cameras. If there are portions of the image which cannot be reconstructed, these portions may be identified in the video stream from camera N−1 (e.g., the right camera of the adjacent pair of cameras). The camera N matrix associated with camera N−1 may be used to fill in any holes in the transformation performed on the video stream from camera N+1.

Figure 18:
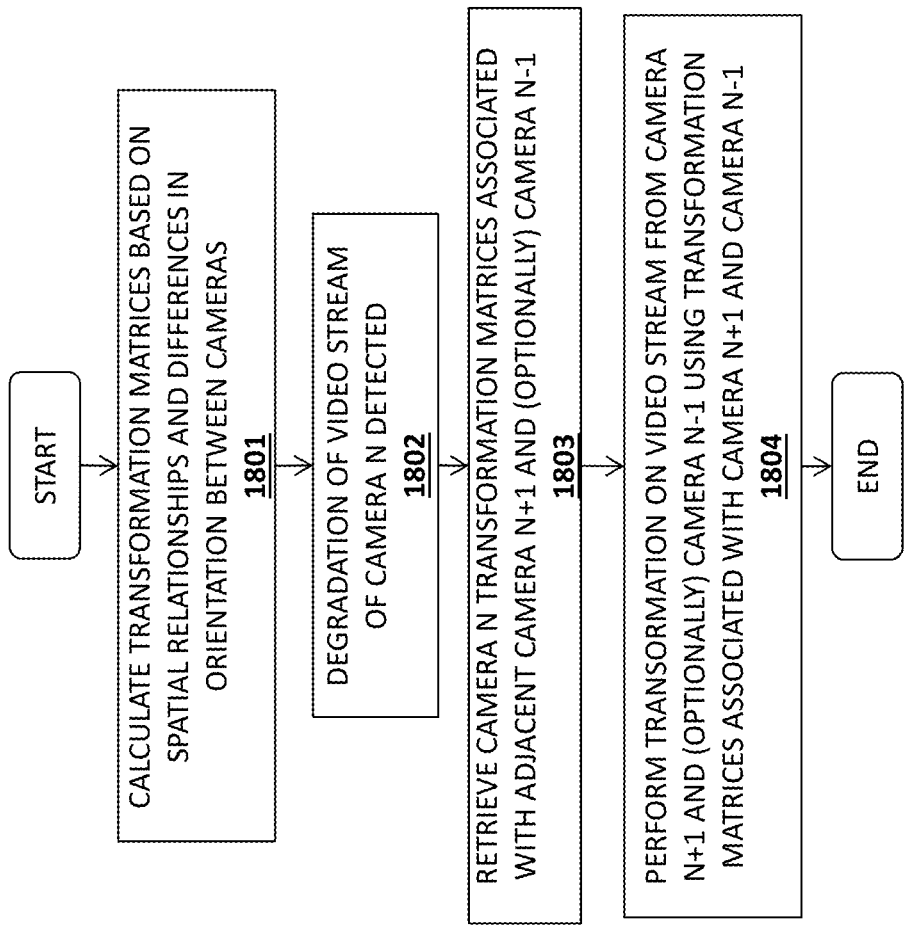
FIG. 18 illustrates a method in accordance with one embodiment of the invention.

A method in accordance with one embodiment of the invention is illustrated in FIG. 18. At 1801, transformation matrices are calculated for each camera, based on spatial relationships and differences in orientation between cameras. At 1802, a degradation of a video stream of camera N is detected. For example, camera N may have failed or may there may be bandwidth issues with the network link.

At 1803, the transformation matrices associated with adjacent cameras N+1 and N−1 are retrieved and, at 1804, a transformation is performed on one or both of the video streams from camera N+1 and camera N−1. For example, the camera N matrix associated with camera N+1 may be used to transform camera N+1's video stream using the transformation matrix to reconstruct the video stream from the perspective of camera N. In one embodiment, the camera selected for the reconstruction is one of the left/right pair. For example, if camera N is a left eye camera, then camera N+1 (used for the transformation) is the corresponding right eye camera. Choosing the alternate eye camera makes sense given the significant correlation in orientation between the left/right cameras.

If there are portions of the image which cannot be reconstructed, these portions may be identified in the video stream from camera N−1 (e.g., the right camera of the adjacent pair of cameras). The camera N matrix associated with camera N−1 may be used to fill in any holes in the transformation performed on the video stream from camera N+1.

Figure 19:
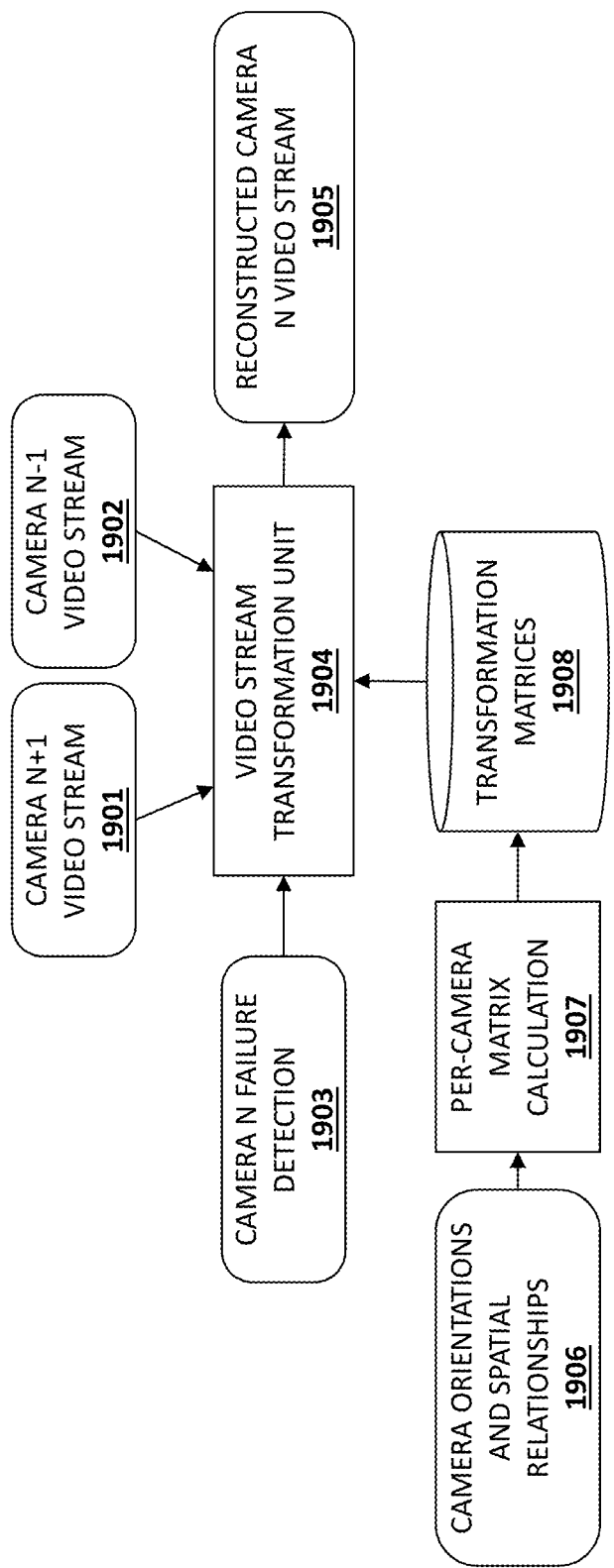
FIG. 19 illustrates an architecture for performing viewing transformations on virtual reality video streams to adjust.

FIG. 19 illustrates an example architecture which includes a per-camera matrix calculation unit 1907 for calculating the various transformation matrices 1908 described herein based on the camera orientations and relative spatial relationships of the cameras 1906 (as described above). In one embodiment, the transformation matrices 1908 are stored for later use.

In response to a failure detection unit 1903 (e.g., a microservices-based monitoring system) detecting a failure of camera N, a video stream transformation unit 1904 reconstructs camera N's video stream based on the video streams of camera N+1 and camera N−1. As mentioned above, the camera N matrix associated with camera N+1 may be used to transform camera N+1's video stream using the transformation matrix to reconstruct the video stream from the perspective of camera N. If there are portions of the image which cannot be reconstructed, these portions may be identified in the video stream from camera N−1. The camera N matrix associated with camera N−1 may be used to fill in any holes in the transformation performed on the video stream from camera N+1.

The techniques described here may be used for a variety of circumstances including, but not limited to insufficient bandwidth, occlusion by objects, and/or equipment failures. While the embodiments described above focus on a camera failure, one embodiment performs the techniques described herein for the sole purpose of reducing bandwidth.

In addition, in one embodiment, the techniques described above are used for efficiently storing video streams of an event for later playback (e.g., after the event has ended). The amount of mass storage space consumed by 6-12 5k video streams is significant. Moreover, in one implementation, capture PODs capture video using motion JPEG (see, e.g., FIG. 10, and MJPEG encoder 1007) which consumes significant bandwidth and storage space.

To reduce bandwidth, only a subset of the camera video streams are recorded for subsequent playback. When a user chooses to watch the recorded event, the transformation matrices are used to reconstruct those video streams which were not recorded. For example, only the left eye cameras may be recorded, and the transformation matrices may be used to reconstruct all of the right eye video streams.

In one embodiment, assuming that each left/right stream was captured, then a difference calculation unit may determine differences between the left and right streams. These differences can then be stored along with one of the two streams. For example, a disparity between adjacent streams (potentially from different pods) may be calculated and only one complete motion jpeg stream may be saved/transmitted. The other stream may be saved using differences between the motion jpeg stream and then reconstructed at the decoder, thereby removing a significant amount of redundancy.

Depth maps may also be generated and used by the algorithm to perform reconstruction of the original stream(s). For example, a monoscopic feed and a depth map may be used to reconstruct a stereo feed. The resolution of this depth map can be quite low. Disparity every inch, for example, is not required. At a low granularity, the depth map can be encoded using 8 bits total (e.g., granularity of 5-10 feet). Special types of processing may be performed for occluded objects (e.g., switching to data redundancy).

Key and Fill Compositing

Figure 20:
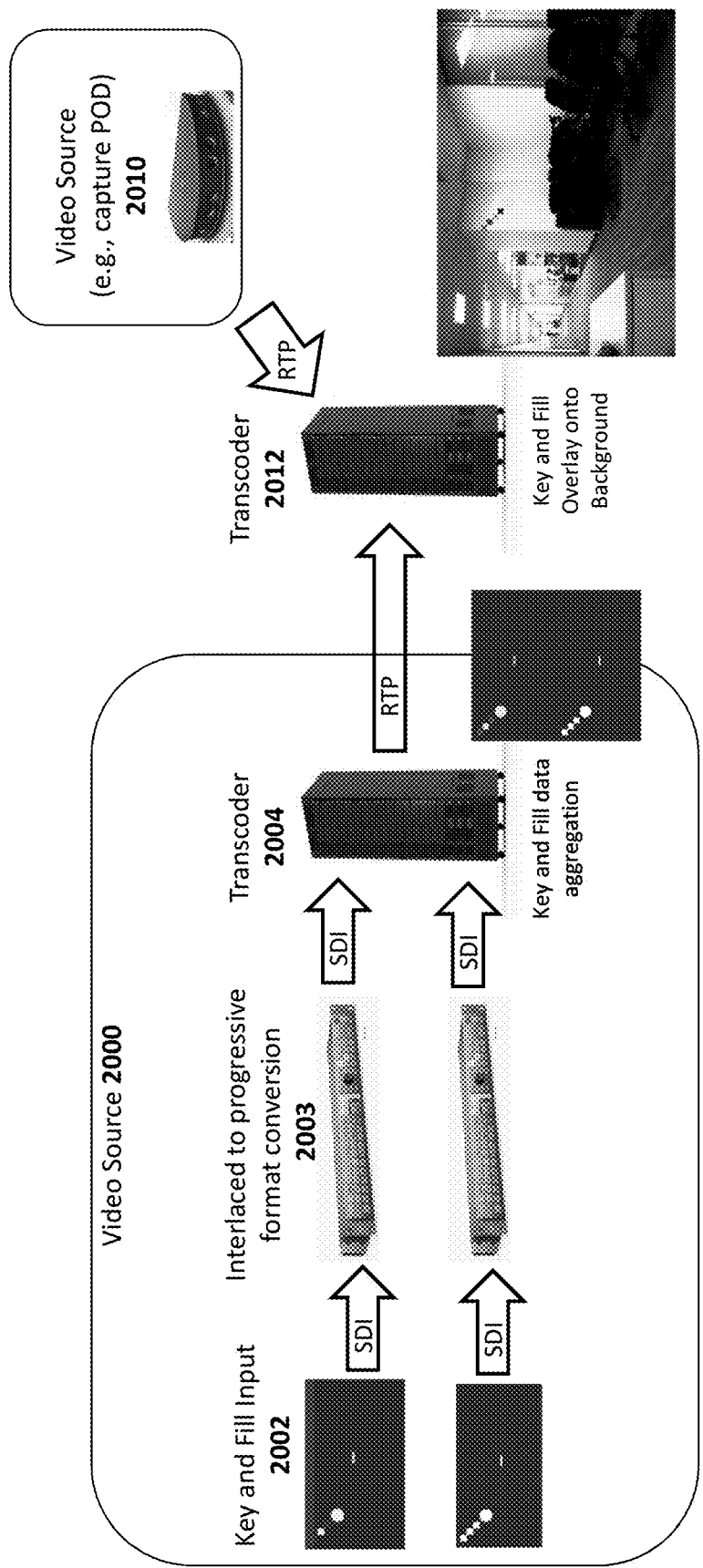
FIG. 20 illustrates one embodiment in which key and fill signals are used for inserting content into a captured video stream.

Referring to FIG. 20, one embodiment of the invention includes multiple transcoders 2004, 2012 to composite video or graphics from another source as a key and fill operation to the synchronized multi-camera VR feeds described herein. In one embodiment, the key is implemented as an alpha channel and fill is implemented as the color channel. A first video source 2000 receives key and fill input 2002 from one or more sources. Video processing circuitry/software 2003 equipped with a serial digital interface (SDI) (potentially on an SDI card) performs interlaced-to-progressive conversion. In one embodiment, this is accomplished by one or more Teranex standards converters, although the underlying principles of the invention are not limited to any particular digital video formats or converters.

After conversion, the progressive video streams are sent via one or more SDI outputs to a first transcoder 2004 which performs key and fill data aggregation on the inputs. The resulting stream is packetized and transmitted to a second transcoder 2012. In one embodiment, the Real-time Transport Protocol (RTP) is used for packetization and streaming, although the underlying principles of the invention are not limited to any particular transmission protocol. The second transcoder 2012 also receives a "background" video stream from a second video source 2010 which, in one implementation, is video captured by one or more capture PODs 1001. The second transcoder 2010 then overlays the key and fill stream onto the background video stream, effectively allowing different types of graphics and graphical effects to be displayed within the panoramic virtual reality image. In one embodiment, the overlay and background video are synchronized.

Parallax can be applied to the overlay so that the view can include depth effects within the panoramic virtual reality video. The composited video or graphics can be used to show event-related, real-time data (such as a game clock, score, statistics, or other relevant data) or can be used as virtual jumbotron and/or a virtual advertisement board.

In one embodiment, the background video is in received in a stereo format, with a left eye view and a right eye view. The overlay video received from video source 2000 may have two channels, one for color and one for transparency. The two videos are timestamped by a single synchronizer and transported over RTP. The transcoder 2012, which may be a compositing video server, receives and aggregates (buffers) timestamped video frames from both sources 2000, 2010 and finds matching frames based on the timestamps to composite the overlay video over the background video. When the overlay is composited, one embodiment of the transcoder 2012 applies parallax to the overlay (e.g., by locating the overlay in slightly different positions for the right and left eyes) to give the viewer a sense of depth in the virtual reality scene.

The embodiments described above provide the ability to composite video or graphics from another source as key and fill using the alpha channel and color channel, respectively, to the synchronized multi-camera virtual reality feeds (video source 2010).

Microservices Implementation

Some embodiments described herein employ a distributed architecture in which service components are accessed remotely through a remote-access protocol, so these components can communicate across different processes, servers and networks. Similar to Object-Oriented Design (OOD) in software architecture, distributed architectures lend themselves to more loosely coupled, encapsulated and modular applications. This in turn promotes improved scalability, modularity and control over development, testing, and deployment of back-end service modules.

In the context of a service-based architecture for a distributed VR broadcasting system as described herein, portions of the overall architecture may be encapsulated into independent services. For example, a first Microservice is used for heart-beat injection, a second Microservice for capture controls, a third Microservice for meta-data injection, and a fourth Microservice for real-time operation monitoring. All services may be developed and maintained independently but designed to work with the overall system.

This service-oriented approach is beneficial for a variety of reasons. First, different programming languages can be used for different services (e.g., C++, C#, Swift, etc). This works particularly well in environments where different team members have expertise in different areas. While some engineers are adding more features to one Microservice others can work on other Microservices concurrently. This helps parallelize the development effort for different deliverables.

Figure 21:
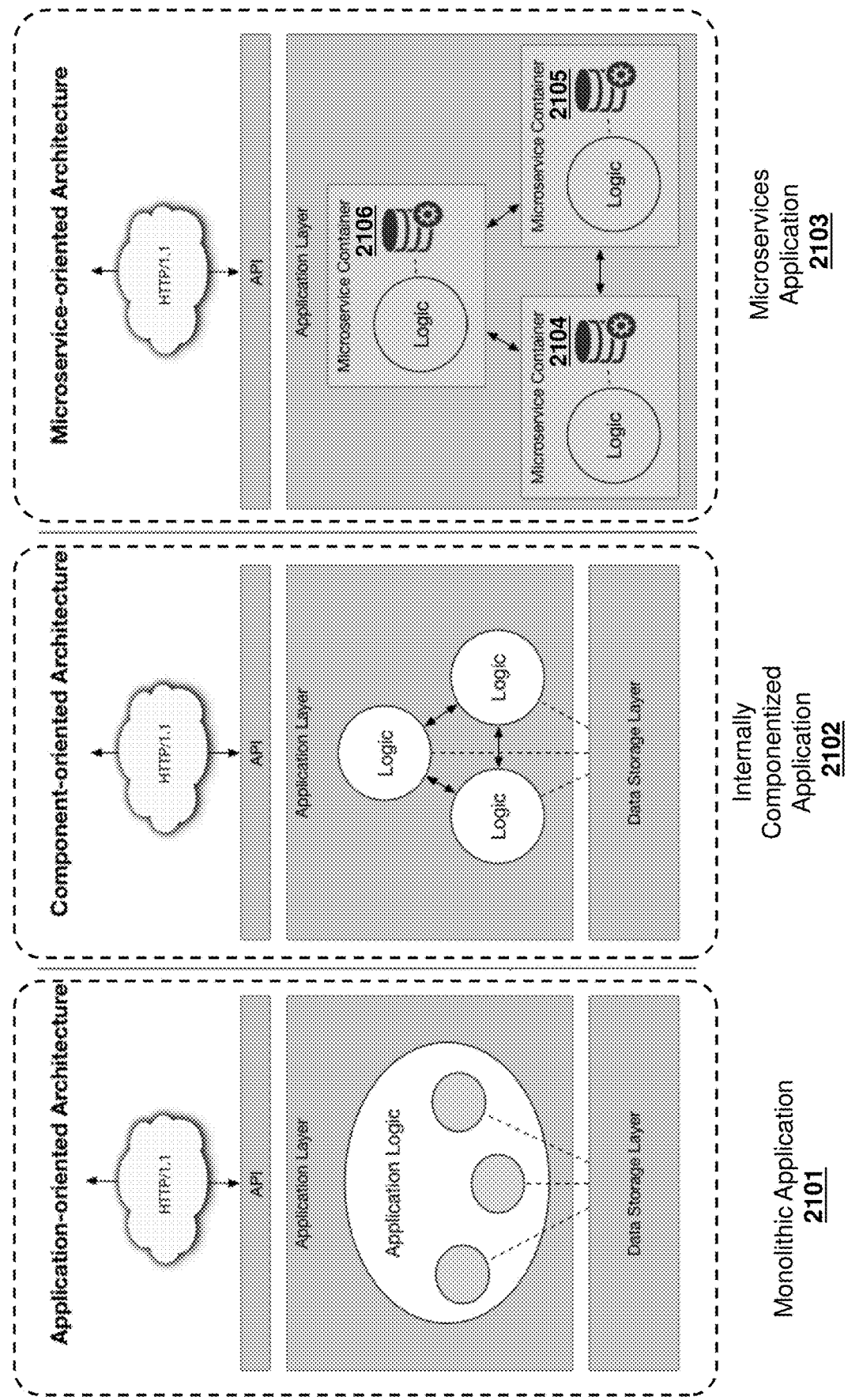
FIG. 21 illustrates a comparison between a microservices architecture and other architectures.

One of the differences between microservices and service-oriented architecture (SOA) is service granularity. The principle for microservices is to take the modularity of service-oriented architecture further into smaller and more manageable functional units. The concept of microservices, as compared with monolithic application 2101 and internally componentized application 2102, is illustrated in FIG. 21. The illustrated microservices application 2103 comprises a plurality of interconnected microservice components 2104-2105 which may be independently executed and updated.

Figure 22:
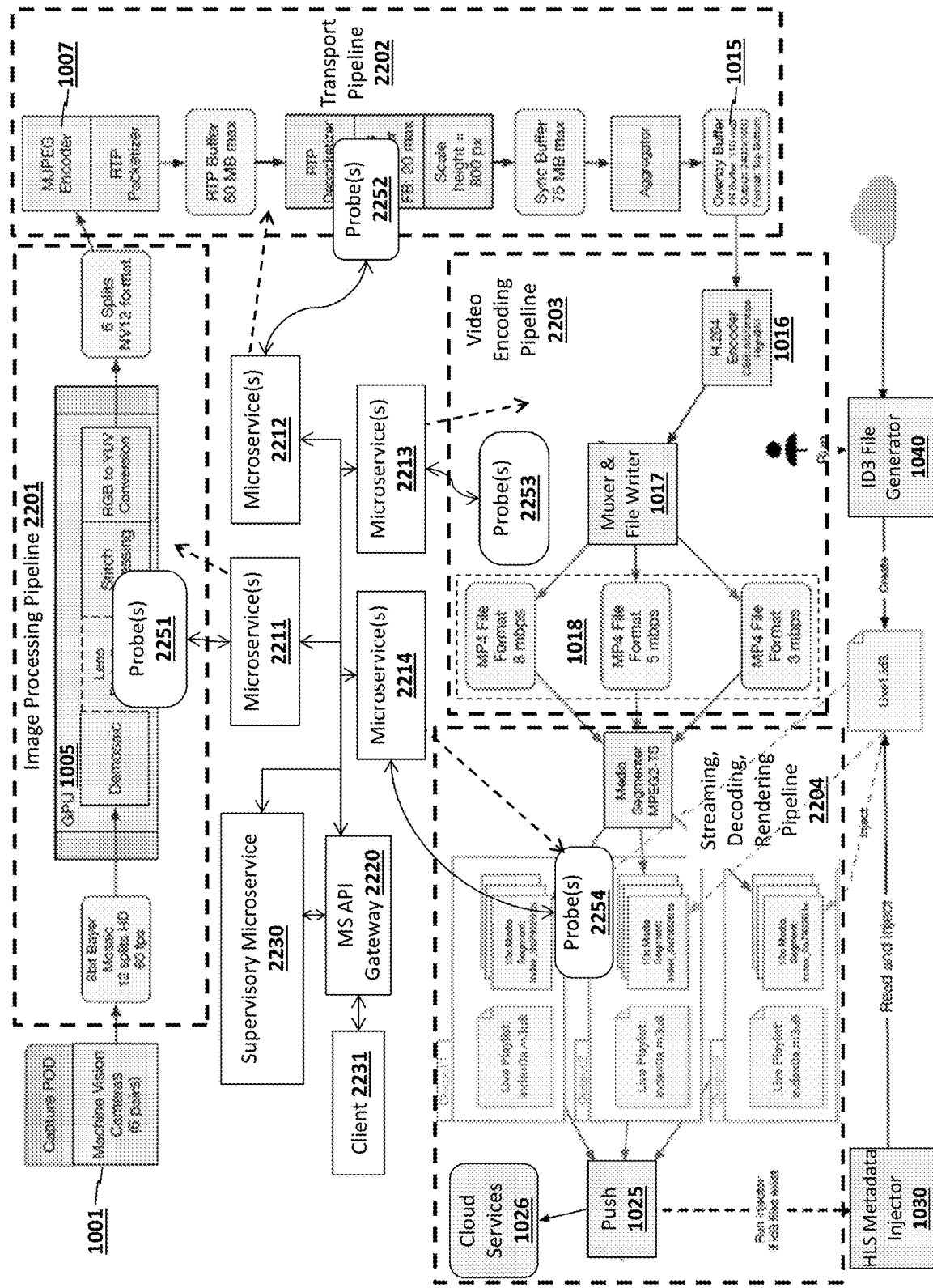
FIG. 22 illustrates microservices integrated within the architecture for capturing and streaming real time video.

In one embodiment, microservices are used to implement components of the virtual reality architecture described herein. FIG. 22 illustrates one such embodiment in which microservices 2211-2214 are executed to perform configuration, monitoring, and management of various portions of the panoramic virtual reality system. In this embodiment, the VR system is logically subdivided into components on which configuration, management, and monitoring may be performed. The particular example illustrated in FIG. 22 includes an image processing pipeline 2201, a transport pipeline 2202, a video encoding pipeline 2203, and a streaming/decoding/rendering pipeline 2204.

One or more probes 2251-2254 are configured to monitor operation of each respective processing component 2201-2204. In one embodiment, each probe 2251-2254 is executed on one or more servers within the processing component 2201-2204 for which it performs monitoring. The server may be the same server used to perform the pipeline processing functions or may be implemented as a dedicated monitoring/management/configuration server. Similarly, one or more servers may be deployed to support the various microservices 2211-2213.

In one embodiment, the probes 2251-2254 run continuously, monitoring various relevant quality metrics for each respective processing component 2201-2204 including, but not limited to, latency metrics, load/resource allocation metrics, and/or bandwidth metrics. The probes 2251-2254 report these quality metrics back to each respective microservice 2211-2213 which may implement a designated response (e.g., reallocating processing resources, offloading work from overloaded servers or GPUs, etc). Alternatively, or in addition, the microservices 2211-2213 may generate notifications to a supervisory microservice 2230 which is capable of rendering system-wide allocation decisions (e.g., moving processing resources from one processing component to another). Communication between the microservices 2211-2213 and the supervisory microservice may be direct or via a microservice API gateway 2220. One or more clients 2231 such as management consoles and/or GUI-based clients may provide user access the data compiled by the microservices 2211-2214, 2230 and to the user to configure the microservices to implement corrective responses.

In FIG. 22, the corrective responses are indicated by the dotted arrows originating from the microservices 2211-2213 to each respective processing component 2201-2204. Only one microservice 2211-2214 is illustrated for each processing component 2201-2204 for simplicity. However, in one embodiment, a first set of microservices may collect and analyze the data provided by the probes 2251-2254, while a second set of microservices, in communication with the first set, may implement corrective actions. By way of example, and not limitation, if the quality metrics indicate that the video encoding pipeline 2203 or some portion thereof has become overloaded (e.g., is experiencing quality degradation), then a load balancing microservice may allocate additional processing resources to the video encoding pipeline 2203 (e.g., allocating a new server or set of video encoding resources to handle the load with acceptable quality).

In one embodiment, the microservices 2211-2213, probes 2251-2254, and other configuration/monitoring/management components may implement remote procedure calls (RPCs) to perform the various operations described herein. However, the underlying principles of the invention are not limited to any particular techniques for distributed data collection and control.

Each microservice 2211-2213, 2230 may be deployed with a Docker container, making it easy for other scripts or executables to launch the microservices. Each physical server can host as few as one microservice container or as many as N containers. Orchestration tools such as Swarm and Kubernetes may be useful in managing the configuration and deployment of these microservice containers.

Real-Time Panoramic Virtual Reality Framework for Dynamic User Experience

One embodiment of the invention comprises a virtual reality (VR) framework geared towards real-time viewing of games such as basketball, football, soccer, and baseball. This embodiment detects in-game events and responsively controls the user experience (e.g., generating graphics when the user's team scores). The framework described herein may be configured based on collected user data to deliver personalized responses to events during the game.

Various types of in-game events may be configured in the framework detected including but not limited to: (a) when a particular team wins; (b) a significant event such as a record being broken or a scoring event (e.g., a touchdown, 3-pt shot, etc); (c) historical relevance of the event (e.g., the player's first stolen base in 10 years, player becomes the winningest pitcher in MLB, basketball player becomes the leading active scorer, etc).

The events may be detected and submitted into the framework manually. Alternatively, or in addition, the events may be detected based on sensors which collect live data such as microphones positioned at different regions of the event location. In addition, timed events related to the game may be used, such as:

Game clock, play clock, and shot clock
Immersive mode: turn on/off the immersive elements based on the clocks (e.g., celebration animation)
Events are synchronized with the actual events in the venue In one embodiment, the user experience is controlled by transmitting commands to the user's client device (e.g., a mobile device, personal computer, virtual reality headset, etc). In response, the client device generates graphics and/or provides supplemental information to be displayed for the user (e.g., supplemental game statistics, supplemental audio). In certain embodiments described below, the commands and/or supplemental information may be inserted within or transmitted with the audio/video stream and prioritized based on the identity of the user. By way of example, and not limitation, the user experience during a particular live or recorded event may be enhanced with one or more of the following:

Video on Demand (VOD) Content—VOD content may include, for example, recorded highlights from the current event and/or relevant clips from prior events (e.g., plays made by a particular player involved in the current event).
Camera Maps—Indicating a viewing point from within a virtual stadium or arena.
Statistics—Various types of statistics may be displayed and/or made available in response to user input, including, but not limited to:
Team data
Player data
Game data
Venue (location) data
Sport data (historical data)
Environment changes-Environmental changes may include movement to another venue or viewing position within the current location.
Supplemental audio feeds-Audio feeds in different languages and/or from different providers may be offered.
Social media data and/or connections-Using social media features, the user is provided with the option to share their experience with family and friends (e.g., via a post comprising a link on a social media site).
Shared experiences with other users-Video and/or animated graphical representations of friends and/or family members of the user may be rendered within the virtual reality scene.
Trivia-Trivia questions related to the event and/or participants in the event may be proffered to the user, along with a GUI for providing answers.
Camera-of-Interest selection—In one embodiment, a "camera of interest" for a particular user or group of users may be selected automatically, based on user preference data, or manually (e.g., where a producer decides which camera/channel is the "camera-of-interest" for a specific user or group of users).

One implementation receives feedback from the various users connected to the system interactively and adjusts event processing accordingly. In addition, one embodiment tracks user history to determine preferences for different types of events. For example:

User voting may be implemented for different groups of users and the results displayed to groups of users.
Sport betting may be implemented within the virtual reality environment.
User comments may be transmitted to producers during the game time and/or after the game so that user features may be adjusted accordingly
User content may be received, processed, and shared with other users (crowd-sourcing the content)

One or more of the following features related to the detection of and generation of personalized events may be implemented in accordance with different embodiments of the invention:

(1) Automatic Fanfare: Audience seating area has fan-only sections. Sound-level meters are installed in the seating of fans sections (for home team and away team) to gauge the fans' excitement based on detected noise level (in decibels). Any excitement (noise) level above a threshold will trigger an immersive event for the specific team. For example, a scoring event for a particular team may be automatically triggered when the noise level for a particular group of fans of that team reaches a threshold. VR users opting for corresponding team celebration events will receive such events and animation will be played out on the user's VR head-mounted device.

(2) Data Mining: Data mining may be performed for trivia and sport statistics using machine learning. Alternatively, an expert sport commenter may pull out interesting data for the end users.

(3) User Profiling: User profile information is gathered, analyzed by producers or machine learning engines, and the analysis identifies personalization features for each user.
 a. Player also keeps records/track of individual user behavior and usage pattern in order to customize the game viewing experience.
 b. User can also provide relevant information to the application for intended events/content.
 c. Geo-location-based Interactivity. For example, the user may interact with other users who are within a geographic proximity.
 d. Geo-location based sponsorship. For example, local commercials may be generated based on the user's current location.

(4) Prioritization of Events/Content in Digital Announcement: The different events and content capable of being transmitted to end users is prioritized for each individual user based on relevancy and/or user preferences. In one embodiment, the timing of content consumption is determined automatically in accordance with the prioritization (e.g., when the time is most appropriate for this particular user).

For example, if a particular team just won the game, the events processed for the user will be based on the user's interests and preferences (e.g., only team events will be generated a user more interested in a team but not a particular player).

(5) Eye-tracking in Head Mounted Display: In one embodiment, eye tracking sensors and detection hardware/software are used to position the central point of panoramic viewing. Switching to a "camera-of-interest" may be performed to automatically choose the best camera view for each user. The eye direction of groups of users may be averaged to determine where the action is in a game and adjust processing of the video stream accordingly (e.g., direct more processing resources to this region to generate higher quality images). In addition, immersive audio may be used and the focus of the audio speaking point may be adjusted to follow the viewing region of each user's eyes. Computer vision processing and artificial intelligence/machine learning may also be used to automatically detect and select the most appropriate "camera-of-interest" based on data collected during the event and/or prior event of the same event type.

Instant Replay

Figure 23:
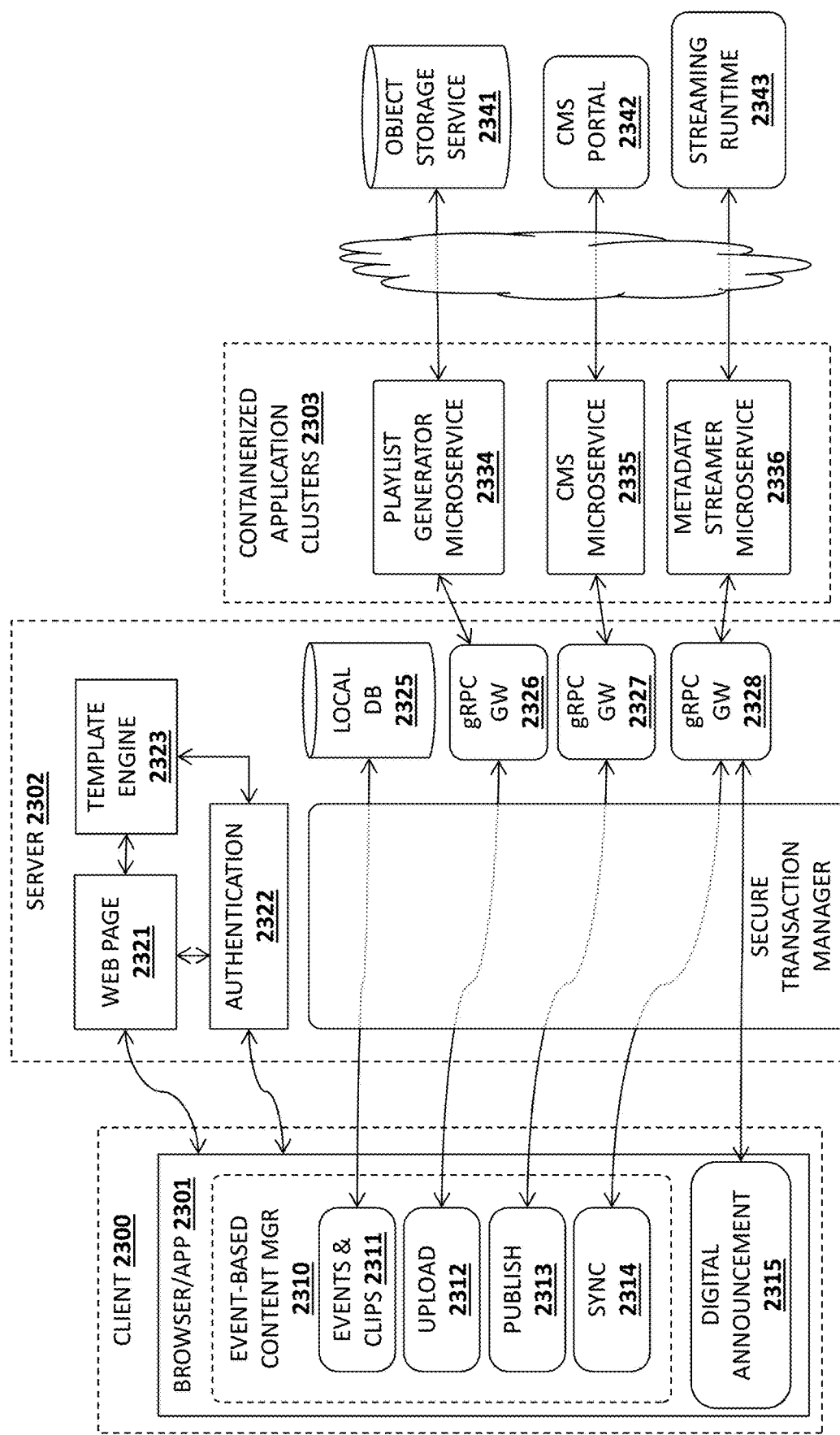
FIGS. 23-24 illustrates embodiments of an architecture for implementing instant replay features.

In one embodiment, a producer watches the virtual reality broadcast stream either on-site or remotely to capture each play in a game. FIG. 23 illustrates one embodiment of an architecture for indexing and retrieval of audio/video clips in response to input from the producer. In particular, a producer (or other user) connects via a browser/app 2301 of a client 2300 which includes event-based content management logic 2310 and digital announcement logic 2315. In one embodiment, the event-based content management logic 2310 includes a component for managing events and clips 2311 stored in a local database 2325, a component for uploading playlists 2312 via a playlist generator microservice 2334, a component for publishing content via a content management service (CMS) microservice 2335, and synchronization logic 2314 for synchronizing metadata and content indices with a metadata streamer microservice 2336. In one embodiment, the microservices 2334-2336 are managed as containerized application clusters 2303 and are coupled to the client 2300 via a server 2302. In one particular embodiment, gRPC (Google Remote Procedure Call) gateways 2326-2328 couple the microservices 2334-2336, respectively, to the server 2302 and client 2300.

In one embodiment, the digital announcement logic 2315 comprises one or more commands transmitted from the metadata streamer microservice 2336 to generate graphics, audio, and/or other effects on the user's client 2300 in response to events. For example, when the user's football team scores a touchdown, confetti or other types of graphics and/or audio may be generated. In this embodiment, different users may receive different sets of commands to generate the "digital announcement", depending on the preferences of each user.

In one embodiment, authentication logic 2322 on the server 2302 authenticates the user (e.g., via a user name/password combination). If authentication is successful, a template engine 2323 generates a web page 2321 based on a current application template which includes the event-based content manager 2310. Once authenticated, a secure transaction manager 2324 establishes secure communication channels between the event-based content manager 2310 and the containerized application clusters 2303 (e.g., using SSL or other transport layer security protocol). In one embodiment, the interaction between the browser/app 2301 and server 2302 is implemented using HTTP/HTTPS GET and POST commands. In addition, a representational state transfer (REST) application programming interface (API) may be used to manage communication with the event-based content manager components 2311-2314.

As mentioned, one embodiment of the containerized application clusters 2303 include a playlist generator microservice 2334 for identifying a set of audio/video clips to be included in a playlist (e.g., a "highlight" reel for a particular event), a content management system (CMS) microservice 2335 for generating/processing indexing data to index each clip based on input from the producer or automatically via an artificial intelligence engine, and a metadata streamer microservice 2336 to stream metadata along with live clips into the system to be accessed by the producer and end users.

A user/producer may connect to the system via the app/web browser 2301 and execute the event-based content manager 2310 (sometimes referred to herein as an "instant replay app" 2310) which may be implemented as an application or using browser-based program code (e.g., such as a plugin or extension).

In one embodiment, an external object storage service 2341 stores the video content captured by the VR system described herein and provides portions of the video to the playlist generator microservice 2334 upon request. A content management system portal 2342 provides user access to selected video content, as specified via the publish component 2313 via the CMS microservice 2335. A streaming runtime service 2343 provides the runtime environment in which the user streams live and/or recorded video supplemented with relevant metadata by the metadata streamer microservice 2336.

Figure 24:
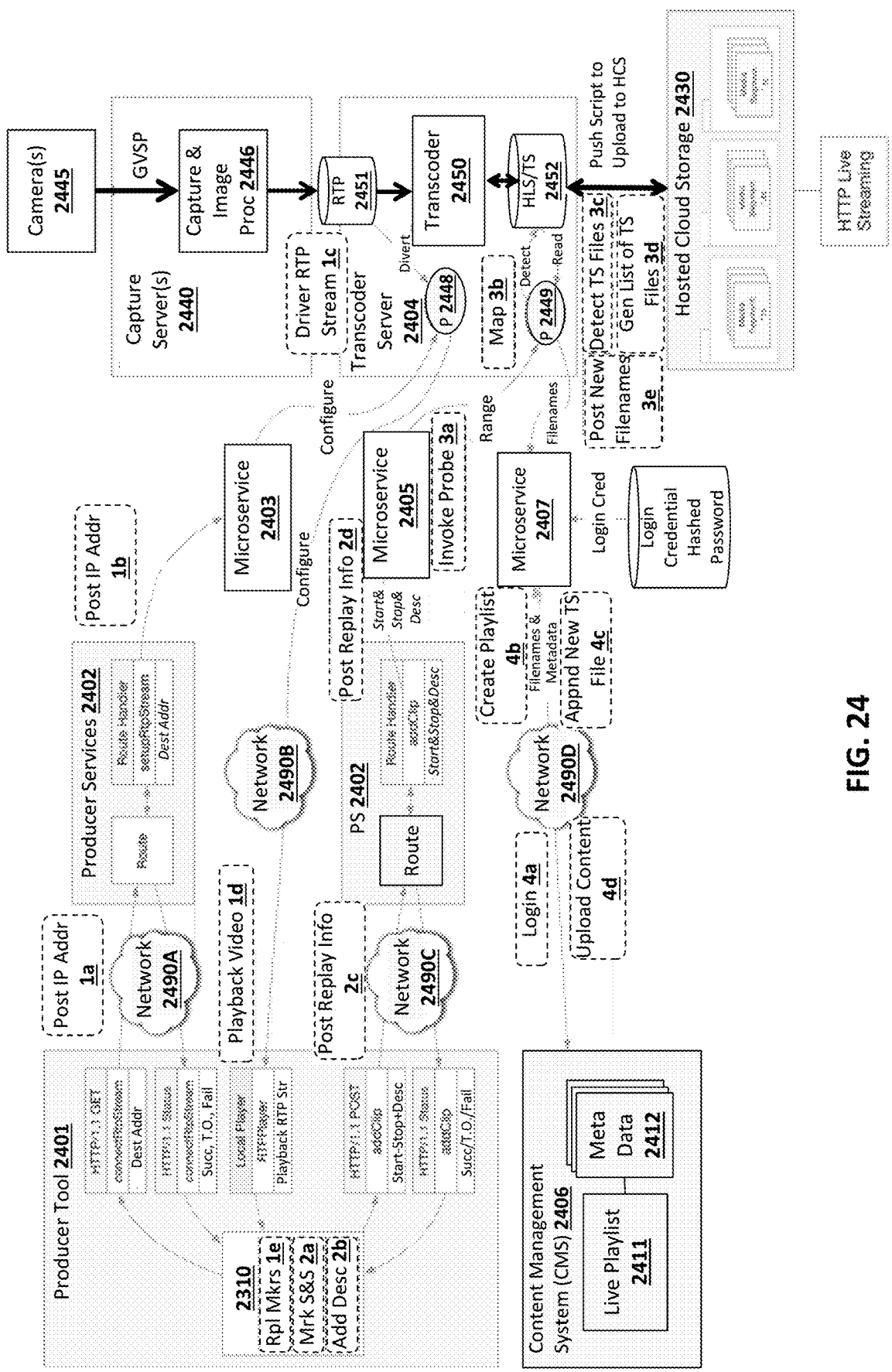

FIG. 24 illustrates a more detailed architecture of one embodiment of the invention. In this implementation, a plurality of cameras 2445 configured at different locations of an event venue capture raw video streams, which are processed as described herein by capture & image processing circuitry/logic 2446 on one or more capture servers 2440. Streams are formatted/compressed and streamed via the real time transport protocol (RTP) 2451 to a transcoder 2450 (or set of transcoders) on a transcoder server 2404 (or cluster of servers), which transcodes the video streams in accordance with one or more protocols and/or bitrates. For example, in one embodiment, the video content is encoded into a plurality of transport streams (TS) 2452 (e.g., at different bitrates) formatted for HTTP live streaming (HLS). In one embodiment, H.264 is used as the underlying encoding format, but the underlying principles of the invention are not so limited. The transport streams are then stored on a hosted cloud storage service 2430 for distribution as described herein.

One embodiment operates in accordance with the following process, in which individual operations are labeled in accordance with the labels in FIG. 24:

1. The producer tool (PT) 2401 (which is the browser/app 2301 in one embodiment) plays back the live stream for the producer via a graphical user interface (GUI) such as those described below.
    Operation 1a: The producer tool application 2401 provides the Destination IP address to producer services (PS) 2402 via network 2490A by making an HTTP/1.1 GET request. In one embodiment, the producer services 2402 comprise the server 2302 and/or containerized application clusters 2303 described above.
    Operation 1b: The producer services (PS) 2402 route the destination IP address to the real time transport protocol (RTP) streamer microservice (RSMS) 2403. In one embodiment, the RSMS 2403 operates as an RTP stream proxy for the capture server(s) 2440 and/or transcoder server(s) 2404.
    Operation 1c: The RSMS 2403 communicates with a probe 2448 executed on the runtime of the transcoder server 2404 which diverts received RTP streams to the producer tool 2401 via network 2490B. As used in this context, a "probe" is an in-process runtime that is lightweight and works in combination with its surrounding logic (e.g., implementing control functions and collecting data from the runtime).
    Operation 1d: The producer tool 2401 includes a local player to play back the video content provided by the RTP stream (sent from the probe 2404).
    Operation 1e: The producer tool 2401 overlays marker controls over the video screen for the user to mark the replay region of the video content.
2. The user of the producer tool 2401 creates highlights for Instant Replay operations.
    Operation 2a: The producer/user marks the highlight segment (e.g., using a start and stop markers).
    Operation 2b: The producer/user provides a short description related to the highlight.
    Operation 2c: The producer tool 2401 transmits a highlight start/stop indication and the short description to the producer services (PS) 2402 via the network connection 2490C (e.g., via a HTTP/1.1 POST request).
    Operation 2d: The producer services 2402 route the highlight information to the Clip Extractor Microservice (CEMS) 2405
3. A clip extractor microservice (CEMS) 2405 maps timestamps to the filename range (i.e., the range of the clip specified by the producer services 2402)
    Operation 3a: The clip extractor microservice 2405 invokes a probe runtime 2449 within the transcoder server 2404 of the VR processing pipeline to examine the output.
    Operation 3b: The clip extractor microservice 2405 maps the start time and stop time into start and stop filenames, respectively.
    Operation 3c: The probe run-time 2449 detects any newly generated segment files (e.g., .ts files) from the VR processing pipeline in a specified file folder.
    Operation 3d: The probe 2449 creates a list of segment files to be included in the highlight.
    Operation 3e: The probe 2449 communicate the new filename to an uploader microservice (UPMS) 2407 each time a new segment file is generated by the transcoder 2450.
4. The uploader microservice (UPMS) 2407 creates a live playlist based on the new filenames and uploads the playlist and metadata to the content management system (CMS) 2406
    Operation 4a: The uploader microservice 2407 provides login credentials to establish a connection with the content management system (CMS) 2406. In one embodiment, the CMS 2406 is implemented as an Amazon Web Service (AWS) (e.g., an Amazon S3 service), although the underlying principles of the invention are not limited to any particular cloud service.
    Operation 4b: The uploader microservice 2407 create a live playlist file 2411 (e.g., a *.m3u8 file) from a supplied template and the new files.
    Operation 4c: The uploader microservice 2407 appends one or more new transport stream (TS) files and associated metadata 2412 to the live playlist file 2411.
    Operation 4d: The uploader microservice 2407 uploads the live playlist file and associated metadata content using the established network connection 2490D.

User Interface for Instant Replay

Figure 25:
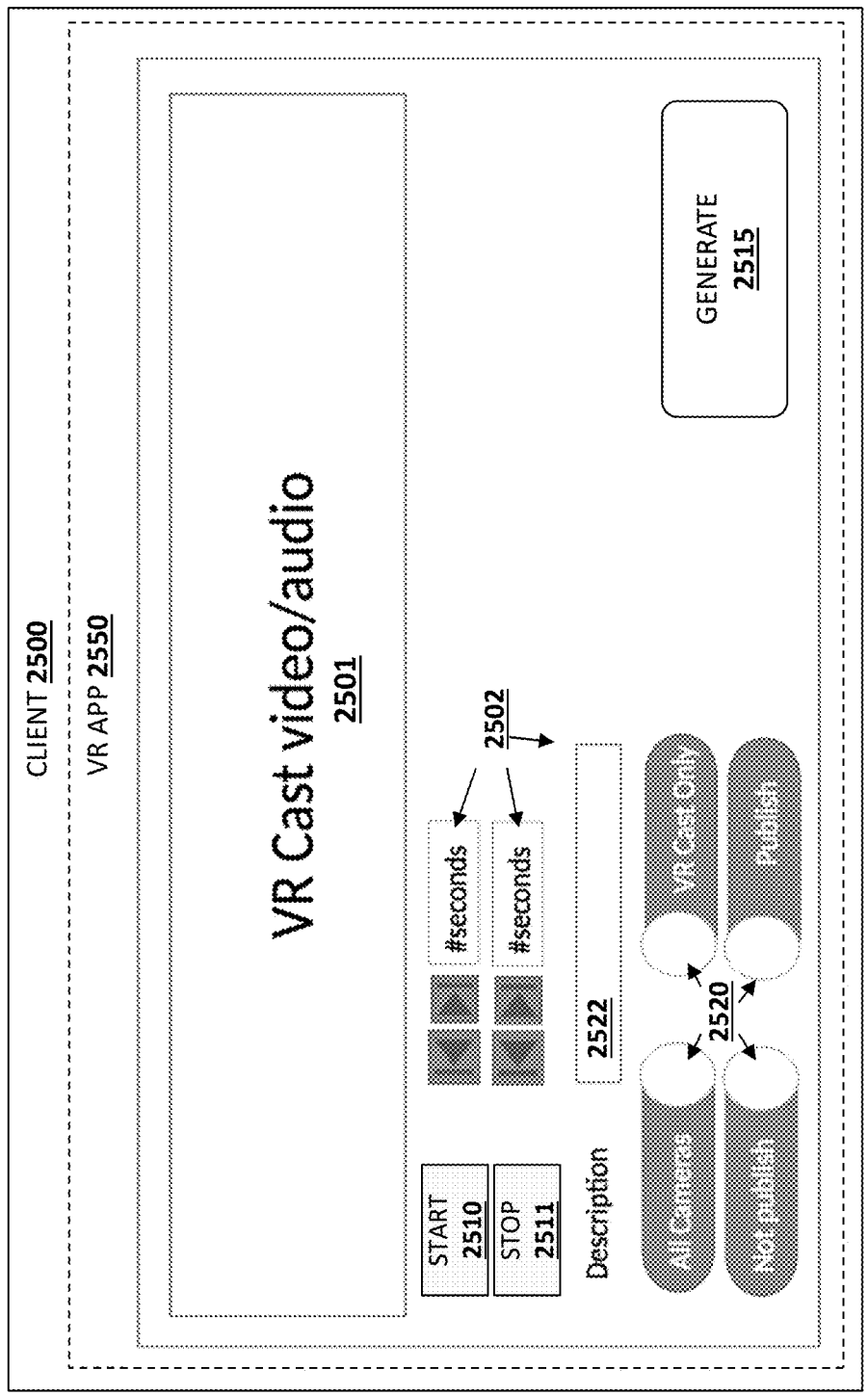
FIGS. 25-26 illustrate graphical user interface (GUI) features used to manage the dynamic user experience features described herein.

FIG. 25 illustrates a client 2500 running a virtual reality application 2550 which includes one embodiment of a user interface for instant replay. In one embodiment, the instant replay GUI includes an audio/video region 2501 for displaying video and rendering audio as well as graphical controls 2502 for marking the media segments for instant replay. In particular, the producer/user navigates to the start point in the video using the controls 2502 and then indicates the start point by selecting start graphic 2510. The producer/user then navigates to the endpoint via the controls 2502 and selects a stop graphic 2511 to indicate the end of the instant replay clip. A description field 2522 is provided to allow the producer/user to enter a short description of the clip.

A plurality of graphical configuration switches 2520 are provided to allow the producer/user to select or de-select options such as whether the start and stop times are to be applied to audio/video streams from all cameras or just selected cameras (e.g., the "cameras of interest"), whether the instant replay should be limited to VR broadcast streams or all streams, and whether the end result generated via the GUI will be published to the content management system 2406. A "generate" graphic 2515 may be selected to cause the system to upload the selected start/stop times and the short description (e.g., the "post replay info" operation 2c in FIG. 24).

Below is more detailed description of these features used in one embodiment of the invention:

TABLE A

| # | Panel | UI Element | MVP Design | Full Design |
|---|---|---|---|---|
| 1 | Display Panel | videoDisplay 2501 | Playback video continuously Display one frame at a | Display a timeline consisting of multiple video frames Allow zoom in/out |

TABLE A-continued

| # | Panel | UI Element | MVP Design | Full Design |
|---|---|---|---|---|
| | | time Show current display time stamp | | of timeline Allow playback operations: Play, Pause, Resume, Stop Show timeline for multiple cameras Select one camera as the current selection |
| 2 | Media Segment Panel | startTime 2510 | Show the label "Start Time" Adjust time using buttons Show a text with the exact time | Render a marker to show the position on timeline Allow user to move the marker Position the marker automatically to allowed time location |
| 3 | Media Segment Panel | stopTime 2511 | Show the label "Stop Time" Adjust time using buttons Show a text with the exact time | Render a marker to show the position on timeline Allow user to move the marker Position the marker automatically to allowed time location |
| 4 | Media Segment Panel | shortDesc 2522 | Provide a Edit Text to enter short description | Add a validator to restrict the correct character set Add a checker for maximum characters allowed Add a grammatical checker for proofreading Provide suggested description using a Combobox |
| 5 | Control Panel | allCameras 2520 | Provide a button for all camera view | Allow configuration for cameras selected for viewing Remove inactive camera view automatically |
| 6 | Control Panel | enableVRCast 2520 | Provide a button for VRCast view | |
| 7 | Control Panel | Generate 2515 | Provide a button to generate live playlist | Allow previewing of Instant Replay clip even it has not been published yet |
| 8 | Control Panel | Publish 2520 | Provide a button to publish the content to CMS. | Perform error checking on all elements used for publishing and point out the cause of an error if the content can't be published successfully. |

In one embodiment, when the "Publish" control 2520 is selected, the content will be pushed to the content management system 2406 as described above and may then trigger the instant play notification on the client side during a live event.

Instant Replay Meta Data

In one embodiment, the metadata used for instant replay is different from the in-bitstream metadata described above and may be carried out-of-bounds of the video stream. Even though it is consumed separately from video content, the instant replay metadata is expected to fall within +/−1 seconds from its corresponding video frame (e.g., identified by the clip's start time) in any buffers and packetized stream. Example metadata is illustrated in Table B below, where EP is the experience player and CEMS is the clip extractor microservice.

TABLE B

| Name | Type | Format | Source | Sink | Description |
|---|---|---|---|---|---|
| startTime | String | HH:MM:SS | Producer Tool | CEMS, EP (optional) | Start time of Instant Replay video clip |
| stopTime | String | HH:MM:SS | Producer Tool | CEMS, EP (optional) | Stop time of Instant Replay video clip |
| clipDesc | String | <=255 Characters | Producer Tool | EP | Short textual description of the Instant Replay video clip |

As mentioned, in one embodiment, different sets of commands and/or graphical/audio content may be transmitted to end users in response to significant events in a game. For example, confetti or other types of graphics and audio may be rendered on the user's client in response to a score by the user's team. Thus, the sets of commands may be uniquely tailored to each user based on the user's preferences (e.g., the identity of the user's team, the user's configuration settings which may include an option to disable digital announcements, etc). In one embodiment, the digital announcement commands are transmitted in the bitstream streaming to the player on the client 2300.

In one embodiment, the apps running on each virtual reality client receive the same set of commands but take different actions based on the preferences of each user. For example, if the user's team takes the lead in a game, the command may cause the VR client app to generate celebratory graphics. In contrast, a client of a different user rooting for the other team would not generate the celebratory graphics (e.g., either not generating any graphics or generating an alternate set of graphics/audio).

In one embodiment, data for an immersive shot clock and/or immersive game clock are also transmitted in the VR audio/video bitstream. The "shot clock" may indicate the amount of time remaining before the team needs to take a shot (e.g., in a basketball game) or run a play (e.g., in a football game). In one embodiment, the immersive shot clock and game clock are rendered around or within the panoramic video displayed within the user's head mounted display (e.g., such that they appear within the context of the game being viewed).

User Interface Graphics and Immersive Modes

Figure 26:
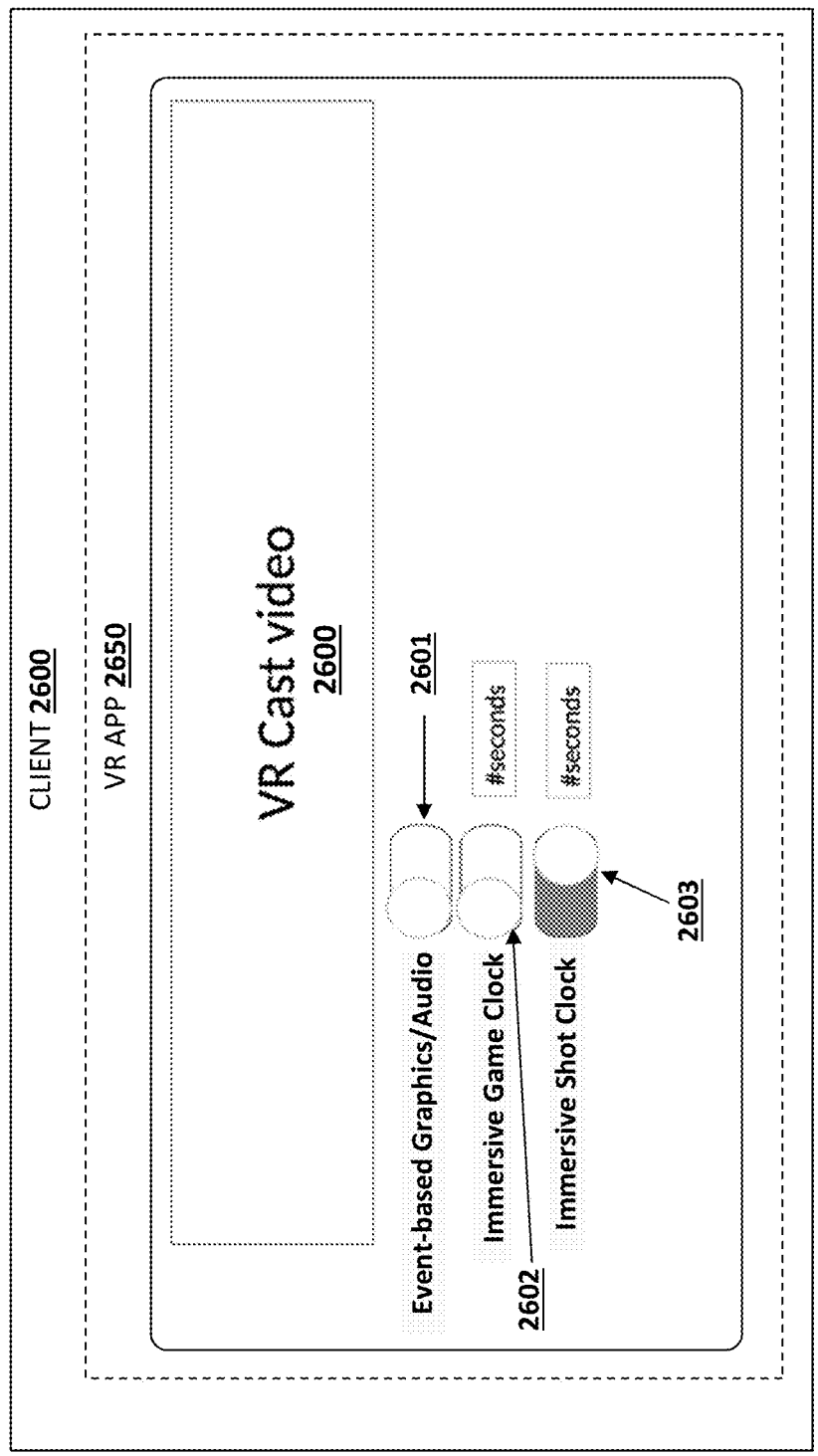

One embodiment of a user interface of a virtual reality application 2650 running on an end-user client 2600 to control these event-based graphics and immersive modes is illustrated in FIG. 26. In one embodiment, a view region 2600 displays the virtual reality broadcast video. Under the VR broadcast video 2600 includes new controls 2601-2603 to allow the end user to configure the local client to process event-triggered commands. In particular, a first graphical switch 2601 allows the user to toggle event-based graphics and audio. Second and third graphical switches 2602-2603 allow the user to toggle the immersive game clock and the immersive shot clock. Thus, in one embodiment, while each client device may receive the same set of commands, the manner in which the commands are processed on the client may be specified by the user and/or may be based on the user's preferences (e.g., team loyalties).

The following is a detailed description for one embodiment of these user interface features is as follows:

| # | Panel | UI Element | MVP Design | Full Design |
|---|-------|-----------|------------|-------------|
| 1 | Display Panel | Video Display | Playback video continuously Display one frame at a time Show current display time stamp | Provide more info about game clock and shot clock, time left before countdown (if known) |
| 2 | Control Panel | Event-based Graphics/Audio (EBGA) Mode | Provide a button 2601 to turn on the EBGA mode | Set the UI state to match with the player's state; Show a help tip for the usage |
| 3 | Control Panel | Immersive Game Clock Mode | Provide a button 2602 to turn on the Immersive Game Clock mode; add an EditText for the countdown time | Set the UI state to match with the player's state Show a help tip for the usage |
| 4 | Control Panel | Immersive Shot Clock Mode | Provide a button 2603 to turn on the Immersive Shot Clock mode; add an EditText for the countdown time | Set the UI state to match with the player's state; show a help tip for the usage |

The embodiments of the invention described herein may be implemented on any type of virtual reality client devices including portable VR clients (e.g., smartphones equipped with VR streaming capabilities) and personal computer clients coupled to VR headsets (e.g., notebooks or desktops running VR software and streaming VR content to an attached headset).

Figure 27:
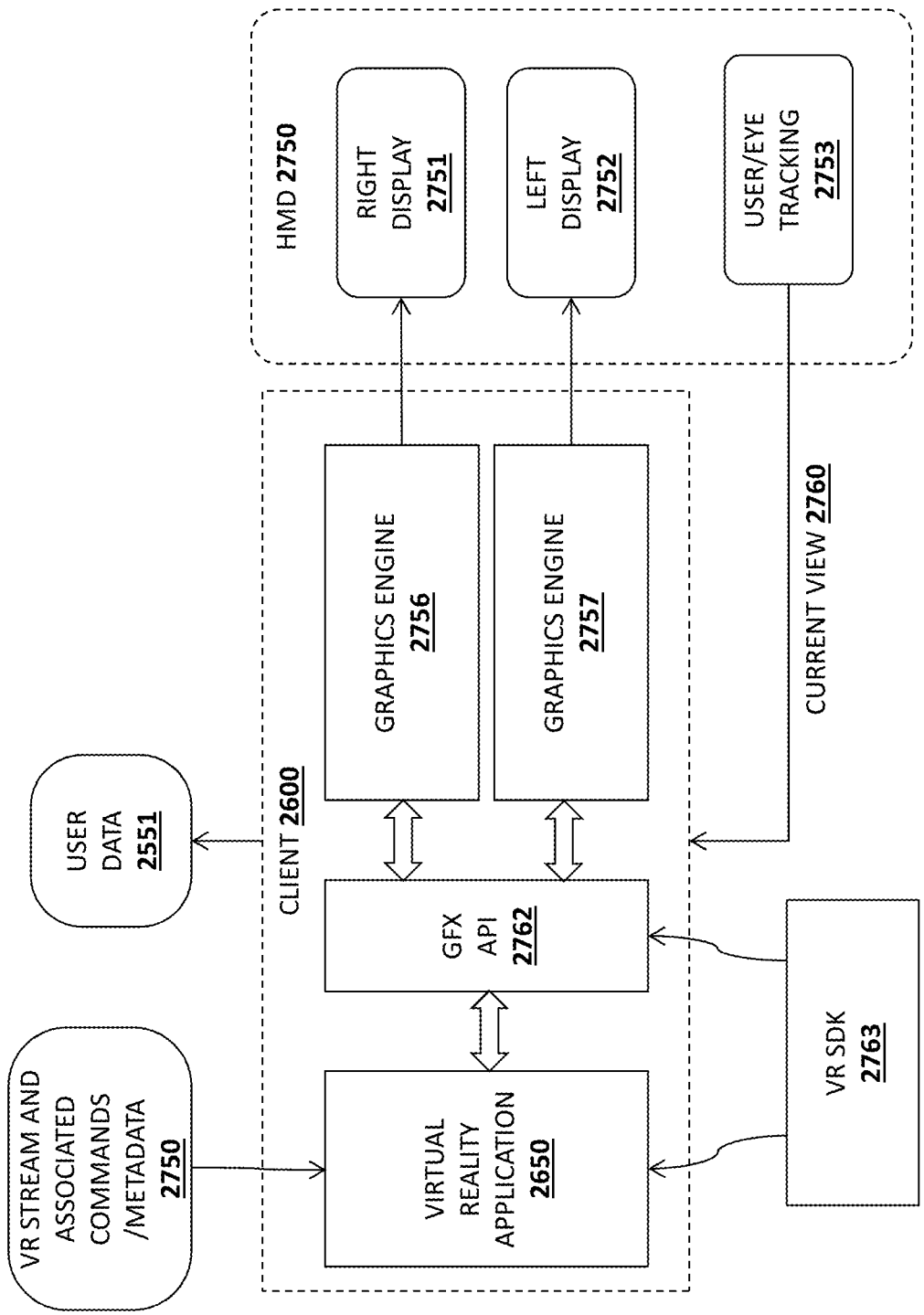
FIG. 27 illustrates one embodiment of a client virtual reality device.

FIG. 27 illustrates one embodiment of client 2600 running a virtual reality application 2650 which implements the techniques described herein based on a VR stream and associated commands/metadata 2750 received from the above-described live VR system. For example, the VR application 2650 may render the VR environment based on the VR stream and generate the GUI shown in FIG. 26 to allow the user to configure the event-based graphics/audio features, the shot clock, and the game clock described herein.

The illustrated embodiment includes dual graphics engines 2756-2757 accessible to the VR application 2650 via a graphics API 2762 to generate right and left video streams for right and left displays 2751-2752, respectively, in a head-mounted display (HMD) 2750. In particular, the right display 2751 displays image frames for viewing by the user's right eye and the left display 2752 displays image frames for viewing by the user's left eye. Separate graphics engines, 2756 and 2757, include graphics processing pipelines for rendering the right and left image frames, respectively, in response to the execution of the virtual reality application 2761. Each of the graphics engines 2756-2757 may comprise a separate graphics processing unit (GPU). Alternatively, the graphics engines 2756-2757 may include different sets of graphics execution resources within a single GPU or spread across multiple GPUs. For example, in a virtualized environment, a separate virtual GPU (vGPU) may be allocated to each display 2751-2752. Regardless of how the GPU resources are partitioned, the graphics engines 2756-2757 may implement any of the graphics processing techniques described herein.

In one embodiment, a user/eye tracking device 2753 integrated on the HMD 2750 includes sensors to detect the current orientation of the user's head and the direction of the user's gaze. For example, the orientation of the user's head may be captured using optical sensors and accelerometers while the current direction of the user's gaze may be captured with optical eye tracking devices such as cameras. As illustrated, the user/eye tracking device 2753 provide the user's current view 2760 to the graphics system 2780, which then adjust graphics processing accordingly (i.e., to ensure that the current image frames being rendered are from the current perspective of the user).

In one embodiment, the virtual reality application 2761 utilizes a graphics application programming interface (API) 2762 to implement features of the graphics engines 2756-2757 as described herein. For example, the graphics API 2762 may be provided with a virtual reality software development kit (SDK) 2763 which a developer may use to generate application program code for the virtual reality application 2761, including the event-based, user-selectable graphics/audio features described herein. For example, the virtual reality SDK 2763 may include a compiler (and/or other design tools) to generate object code for the virtual reality application 2761 which uses the API 2762 (e.g., by making calls to functions/commands included in the API). One or more of the techniques described herein may be implemented using the graphics API 2762, hardware within the graphics engines 2756-2757, and/or a combination thereof.

Figure 28:
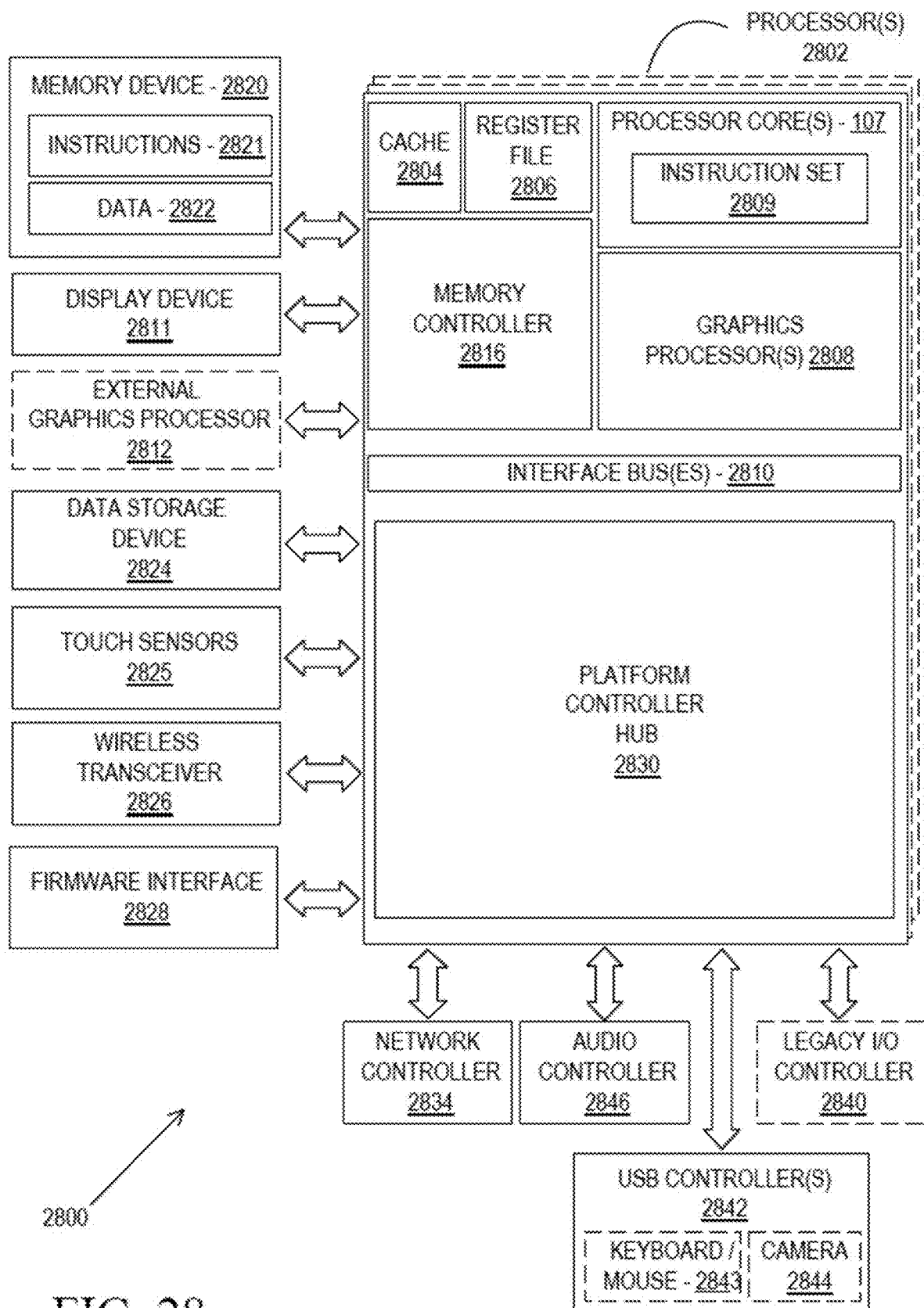
FIG. 28 illustrates one embodiment of a computer system architecture used by clients and/or servers.

FIG. 28 illustrates an exemplary computing architecture which the various clients (e.g., client 2600, 2300) and/or servers (e.g., server 2302) described herein may implement. In various embodiments the system 2800 includes one or more processors 2802 and one or more graphics processors 2808, and may be a single processor desktop system, a multiprocessor workstation system, or a server system having a large number of processors 2802 or processor cores 2807. In one embodiment, the system 2800 is a processing platform incorporated within a system-on-a-chip (SoC) integrated circuit for use in mobile, handheld, or embedded devices.

In one embodiment the system 2800 can include, or be incorporated within a server-based gaming platform, a game console, including a game and media console, a mobile gaming console, a handheld game console, or an online game console. In some embodiments the system 2800 is a mobile phone, smart phone, tablet computing device or mobile Internet device. The processing system 2800 can also include, couple with, or be integrated within a wearable device, such as a smart watch wearable device, smart eyewear device, augmented reality device, or virtual reality device. In some embodiments, the processing system 2800 is a television or set top box device having one or more processors 2802 and a graphical interface generated by one or more graphics processors 2808.

In some embodiments, the one or more processors 2802 each include one or more processor cores 2807 to process instructions which, when executed, perform operations for system and user software. In some embodiments, each of the one or more processor cores 2807 is configured to process a specific instruction set 2809. In some embodiments, instruction set 2809 may facilitate Complex Instruction Set Computing (CISC), Reduced Instruction Set Computing (RISC), or computing via a Very Long Instruction Word (VLIW). Multiple processor cores 2807 may each process a different instruction set 2809, which may include instructions to facilitate the emulation of other instruction sets. Processor core 2807 may also include other processing devices, such a Digital Signal Processor (DSP).

In some embodiments, the processor 2802 includes cache memory 2804. Depending on the architecture, the processor 2802 can have a single internal cache or multiple levels of internal cache. In some embodiments, the cache memory is shared among various components of the processor 2802. In some embodiments, the processor 2802 also uses an external cache (e.g., a Level-3 (L3) cache or Last Level Cache (LLC)) (not shown), which may be shared among processor cores 2807 using known cache coherency techniques. A register file 2806 is additionally included in processor 2802 which may include different types of registers for storing different types of data (e.g., integer registers, floating point registers, status registers, and an instruction pointer register). Some registers may be general-purpose registers, while other registers may be specific to the design of the processor 2802.

In some embodiments, one or more processor(s) 2802 are coupled with one or more interface bus(es) 2810 to transmit communication signals such as address, data, or control signals between processor 2802 and other components in the system 2800. The interface bus 2810, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 2802 include an integrated memory controller 2816 and a platform controller hub 2830. The memory controller 2816 facilitates communication between a memory device and other components of the system 2800, while the platform controller hub (PCH) 2830 provides connections to I/O devices via a local I/O bus.

The memory device 2820 can be a dynamic random access memory (DRAM) device, a static random access memory (SRAM) device, flash memory device, phase-change memory device, or some other memory device having suitable performance to serve as process memory. In one embodiment the memory device 2820 can operate as system memory for the system 2800, to store data 2822 and instructions 2821 for use when the one or more processors 2802 executes an application or process. Memory controller 2816 also couples with an optional external graphics processor 2812, which may communicate with the one or more graphics processors 2808 in processors 2802 to perform graphics and media operations. In some embodiments a display device 2811 can connect to the processor(s) 2802. The display device 2811 can be one or more of an internal display device, as in a mobile electronic device or a laptop device or an external display device attached via a display interface (e.g., DisplayPort, etc.). In one embodiment the display device 2811 can be a head mounted display (HMD) such as a stereoscopic display device for use in virtual reality (VR) applications or augmented reality (AR) applications.

In some embodiments the platform controller hub 2830 enables peripherals to connect to memory device 2820 and processor 2802 via a high-speed I/O bus. The I/O peripherals include, but are not limited to, an audio controller 2846, a network controller 2834, a firmware interface 2828, a wireless transceiver 2826, touch sensors 2825, a data storage device 2824 (e.g., hard disk drive, flash memory, etc.). The data storage device 2824 can connect via a storage interface (e.g., SATA) or via a peripheral bus, such as a Peripheral Component Interconnect bus (e.g., PCI, PCI Express). The touch sensors 2825 can include touch screen sensors, pressure sensors, or fingerprint sensors. The wireless transceiver 2826 can be a Wi-Fi transceiver, a Bluetooth transceiver, or a mobile network transceiver such as a 3G, 4G, or Long Term Evolution (LTE) transceiver. The firmware interface 2828 enables communication with system firmware, and can be, for example, a unified extensible firmware interface (UEFI). The network controller 2834 can enable a network connection to a wired network. In some embodiments, a high-performance network controller (not shown) couples with the interface bus 2810. The audio controller 2846, in one embodiment, is a multi-channel high definition audio controller. In one embodiment the system 2800 includes an optional legacy I/O controller 2840 for coupling legacy (e.g., Personal System 2 (PS/2)) devices to the system. The platform controller hub 2830 can also connect to one or more Universal Serial Bus (USB) controllers 2842 connect input devices, such as keyboard and mouse 2843 combinations, a camera 2844, or other USB input devices.

It will be appreciated that the system 2800 shown is exemplary and not limiting, as other types of data processing systems that are differently configured may also be used. For example, an instance of the memory controller 2816 and platform controller hub 2830 may be integrated into a discreet external graphics processor, such as the external graphics processor 2812. In one embodiment the platform controller hub 2830 and/or memory controller 2860 may be external to the one or more processor(s) 2802. For example, the system 2800 can include an external memory controller 2816 and platform controller hub 2830, which may be configured as a memory controller hub and peripheral controller hub within a system chipset that is in communication with the processor(s) 2802.

Embodiments of the invention may include various steps, which have been described above. The steps may be embodied in machine-executable instructions which may be used to cause a general-purpose or special-purpose processor to perform the steps. For example, the machine-executable instructions may be stored on a storage device or in a memory and may be read by the processor to perform the recited steps. Alternatively, these steps may be performed by specific hardware components that contain hardwired logic for performing the steps, or by any combination of programmed computer components and custom hardware components.

EXAMPLES

The following are example implementations of different embodiments of the invention.

Example 1

A method comprising: capturing video of an event at an event venue with a plurality of cameras to produce a corresponding plurality of video streams; generating a virtual reality (VR) stream based on the plurality of video streams; transmitting the VR stream to a plurality of client VR devices, wherein the client VR devices are to render VR environments based on the VR stream; detecting a triggering event during the event; and transmitting an indication of the triggering event to the plurality of client VR devices, wherein a first client VR device is to generate first event-based graphics and/or first event-based audio within a first VR environment in accordance with the indication.

Example 2

The method of example 1 wherein the event comprises a sporting event and wherein the triggering event comprises a scoring event by a first team participating in the event.

Example 3

The method of example 2 wherein the plurality of client VR devices are each configurable to generate different event-based graphics and/or event-based audio responsive to the indication of the triggering event.

Example 4

The method of example 3 wherein a second client VR device is to generate second event-based graphics and/or event-based audio in accordance with the indication, the second event-based graphics and/or event-based audio different from the first event-based graphics and/or event-based audio.

Example 5

The method of example 3 wherein each client VR device is to be configured based on determined preferences of a user of the client VR device.

Example 6

The method of example 5 wherein the preferences of the user comprise an indication of sporting teams which the user follows.

Example 7

The method of example 6 wherein the first event-based graphics and/or first event-based audio comprises celebratory graphics and/or audio based on the scoring event by a first team.

Example 8

A machine-readable medium having program code stored thereon which, when executed by a machine, causes the machine to perform the operations of: capturing video of an event at an event venue with a plurality of cameras to produce a corresponding plurality of video streams; generating a virtual reality (VR) stream based on the plurality of video streams; transmitting the VR stream to a plurality of client VR devices, wherein the client VR devices are to render VR environments based on the VR stream; detecting a triggering event during the event; transmitting an indication of the triggering event to the plurality of client VR devices, wherein a first client VR device is to generate first event-based graphics and/or first event-based audio within a first VR environment in accordance with the indication.

Example 9

The machine-readable medium of example 8 wherein the event comprises a sporting event and wherein the triggering event comprises a scoring event by a first team participating in the event.

Example 10

The machine-readable medium of example 9 wherein the plurality of client VR devices are each configurable to generate different event-based graphics and/or event-based audio responsive to the indication of the triggering event.

Example 11

The machine-readable medium of example 10 wherein a second client VR device is to generate second event-based graphics and/or event-based audio in accordance with the indication, the second event-based graphics and/or event-based audio different from the first event-based graphics and/or event-based audio.

Example 12

The machine-readable medium of example 10 wherein each client VR device is to be configured based on determined preferences of a user of the client VR device.

Example 13

The machine-readable medium of example 12 wherein the preferences of the user comprise an indication of sporting teams which the user follows.

Example 14

The machine-readable medium of example 13 wherein the first event-based graphics and/or first event-based audio comprises celebratory graphics and/or audio based on the scoring event by a first team.

Example 15

An apparatus comprising: a memory to store program code including virtual reality (VR) program code; a processor to execute the program code to perform a plurality of operations comprising: receiving a virtual reality (VR) video stream comprising video of an event; rendering a VR environment based on the VR stream; receiving an indication of a triggering event during the event; and generating first event-based graphics and/or first event-based audio within the VR environment in accordance with the indication.

Example 16

The apparatus of example 15 wherein the event comprises a sporting event and wherein the triggering event comprises a scoring event by a first team participating in the event.

Example 17

The apparatus of example 16 wherein the plurality of client VR devices are each configurable to generate different event-based graphics and/or event-based audio responsive to the indication of the triggering event.

Example 18

The apparatus of example 17 wherein a second client VR device is to generate second event-based graphics and/or event-based audio in accordance with the indication, the second event-based graphics and/or event-based audio different from the first event-based graphics and/or event-based audio.

Example 19

The apparatus of example 17 wherein each client VR device is to be configured based on determined preferences of a user of the client VR device.

Example 20

The apparatus of example 19 wherein the preferences of the user comprise an indication of sporting teams which the user follows.

Example 21

The apparatus of example 20 wherein the first event-based graphics and/or first event-based audio comprises celebratory graphics and/or audio based on the scoring event by a first team.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals-such as carrier waves, infrared signals, digital signals, etc.).

In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

The invention claimed is:

1. A method comprising:
capturing video of an event at an event venue with a plurality of cameras to produce a corresponding plurality of video streams;
generating a virtual reality (VR) stream based on the plurality of video streams;
transmitting the VR stream to a plurality of client VR devices, wherein the client VR devices are to render VR environments based on the VR stream;
detecting a triggering event during the event; and
transmitting an indication of the triggering event to a first client VR device based on user history of a user of the first client VR device, wherein the first client VR device is to generate first event-based graphics and/or first event-based audio within a first VR environment in accordance with the indication, wherein the user history of the user is to cause the indication of the triggering event of user voting for a group to which the user belongs, and wherein the first event-based graphics and/or first event-based audio comprises voting result of the group.

2. The method of claim 1 wherein the event comprises a sporting event and wherein the triggering event comprises a scoring event by a first team participating in the event.

3. The method of claim 2 wherein the plurality of client VR devices are each configurable to generate different event-based graphics and/or event-based audio responsive to the indication of the triggering event.

4. The method of claim 3 wherein a second client VR device is to generate second event-based graphics and/or event-based audio in accordance with the indication, the second event-based graphics and/or event-based audio different from the first event-based graphics and/or event-based audio.

5. The method of claim 3 wherein each client VR device is to be configured based on determined preferences of a respective user of the client VR device.

6. The method of claim 5 wherein the preferences of the respective user comprise an indication of sporting teams which the user follows.

7. The method of claim 2 wherein the first event-based graphics and/or first event-based audio comprises celebratory graphics and/or audio based on the scoring event by a first team.

8. A non-transitory machine-readable medium having program code stored thereon which, when executed by a machine, causes the machine to perform the operations of:
capturing video of an event at an event venue with a plurality of cameras to produce a corresponding plurality of video streams;
generating a virtual reality (VR) stream based on the plurality of video streams;
transmitting the VR stream to a plurality of client VR devices, wherein the client VR devices are to render VR environments based on the VR stream;
detecting a triggering event during the event; and
transmitting an indication of the triggering event to a first client VR device based on user history of a user of the first client VR device, wherein the first client VR device is to generate first event-based graphics and/or first event-based audio within a first VR environment in accordance with the indication, wherein the user history of the user is to cause the indication of the triggering event of user voting for a group to which the user belongs, and wherein the first event-based graphics and/or first event-based audio comprises voting result of the group.

9. The non-transitory machine-readable medium of claim 8 wherein the event comprises a sporting event and wherein the triggering event comprises a scoring event by a first team participating in the event.

10. The non-transitory machine-readable medium of claim 9 wherein the plurality of client VR devices are each configurable to generate different event-based graphics and/or event-based audio responsive to the indication of the triggering event.

11. The non-transitory machine-readable medium of claim 10 wherein a second client VR device is to generate second event-based graphics and/or event-based audio in accordance with the indication, the second event-based graphics and/or event-based audio different from the first event-based graphics and/or event-based audio.

12. The non-transitory machine-readable medium of claim 10 wherein each client VR device is to be configured based on determined preferences of a respective user of the client VR device.

13. The non-transitory machine-readable medium of claim 12 wherein the preferences of the respective user comprise an indication of sporting teams which the user follows.

14. An apparatus comprising:
a memory to store program code including virtual reality (VR) program code;
a processor to execute the program code to perform a plurality of operations comprising:
receiving a virtual reality (VR) video stream comprising video of an event;
rendering a VR environment based on the VR stream;
receiving an indication of a triggering event during the event, wherein the indication is transmitted to the apparatus based on user history of a user of the apparatus; and
generating first event-based graphics and/or first event-based audio within the VR environment in accordance with the indication, wherein the user history of the user is to cause the indication of the triggering event of user voting for a group to which the user belongs, and wherein the first event-based graphics and/or first event-based audio comprises voting result of the group.

15. The apparatus of claim 14 wherein the event comprises a sporting event and wherein the triggering event comprises a scoring event by a first team participating in the event.

16. The apparatus of claim 15 wherein the apparatus is configurable to generate different event-based graphics and/or event-based audio responsive to the indication of the triggering event.

17. The apparatus of claim 14 wherein the apparatus is to be configured based on determined preferences of the user of the apparatus.

18. The apparatus of claim 17 wherein the preferences of the user comprise an indication of sporting teams which the user follows.

19. The apparatus of claim 15 wherein the first event-based graphics and/or first event-based audio comprises celebratory graphics and/or audio based on the scoring event by a first team.

20. The method of claim 1, wherein the triggering event is detected when a noise level at a section of the event venue is over a threshold.

21. The method of claim 1, wherein the first client VR device generates the first event-based graphics and/or first event-based audio within a first VR environment in response to input from the user through a user interface of the first client VR device.

22. The method of claim 1, wherein transmitting the indication of the triggering event to the first client VR device is further based on a geographic location of user, wherein the first event-based graphics and/or first event-based audio within the VR environment further comprises one or more commercials for the geographic location.

23. The method of claim 1, wherein the VR stream is generated for the user based on the user's eye direction as determined by one or more tracking sensors.

24. The method of claim 1, wherein timing of the first event-based graphics and/or first event-based audio being consumed is based on user preferences of the user of the first client VR device.

* * * * *